US010148931B2

(12) United States Patent
Haruyama

(10) Patent No.: US 10,148,931 B2
(45) Date of Patent: Dec. 4, 2018

(54) THREE-DIMENSIONAL VIDEO IMAGE DISPLAY PROCESSING DEVICE, VIDEO INFORMATION RECORDING MEDIUM, VIDEO INFORMATION PROVIDING SERVER, AND RECORDING MEDIUM STORING A PROGRAM

(71) Applicant: KANEKO Manufacturing Co., Ltd., Saitama (JP)

(72) Inventor: Yoshihisa Haruyama, Saitma (JP)

(73) Assignee: Kaneko Manufacturing Co., Ltd., Saitama (JP)

( * ) Notice: Subject to any disclaimer, the term of this patent is extended or adjusted under 35 U.S.C. 154(b) by 0 days.

(21) Appl. No.: 15/804,931

(22) Filed: Nov. 6, 2017

(65) Prior Publication Data

US 2018/0131921 A1 May 10, 2018

(30) Foreign Application Priority Data

Nov. 10, 2016 (JP) ................................. 2016-220072

(51) Int. Cl.
*G02B 27/22* (2018.01)
*H04N 13/122* (2018.01)
*H04N 13/128* (2018.01)
*H04N 13/282* (2018.01)
*H04N 13/279* (2018.01)

(52) U.S. Cl.
CPC ....... *H04N 13/122* (2018.05); *G02B 27/2214* (2013.01); *H04N 13/128* (2018.05); *H04N 13/282* (2018.05); *H04N 13/279* (2018.05)

(58) Field of Classification Search
None
See application file for complete search history.

(56) References Cited

U.S. PATENT DOCUMENTS 6,373,518 B1 * 4/2002 Sogawa .................. G06K 9/03
348/218.1

FOREIGN PATENT DOCUMENTS

| JP | 2998791 | 1/2000 |
| JP | 3284190 | 5/2002 |
| JP | 2005-275482 | 10/2005 |
| JP | 4740481 | 8/2011 |

* cited by examiner

*Primary Examiner* — Michelle Chin
(74) *Attorney, Agent, or Firm* — Thomas|Horstemeyer, LLP

(57) ABSTRACT

A three-dimensional video image display processing device that causes a three-dimensional image to be displayed on a display by processing a first video information and a second video information. The three-dimensional video image display processing device includes: a DP matching processor that sets a matching scan direction to a direction of a line segment connecting a viewpoint center of the first video information with a viewpoint center of the second video information, and that uses DP matching to obtain depth estimation information for pixels extracted by a first thinned image extraction section and a second thinned image extraction section; and a display information generation section that generates movie display information for the display using video information of either the first video information or the second video information and using the depth estimation information obtained by the DP matching processor.

12 Claims, 14 Drawing Sheets

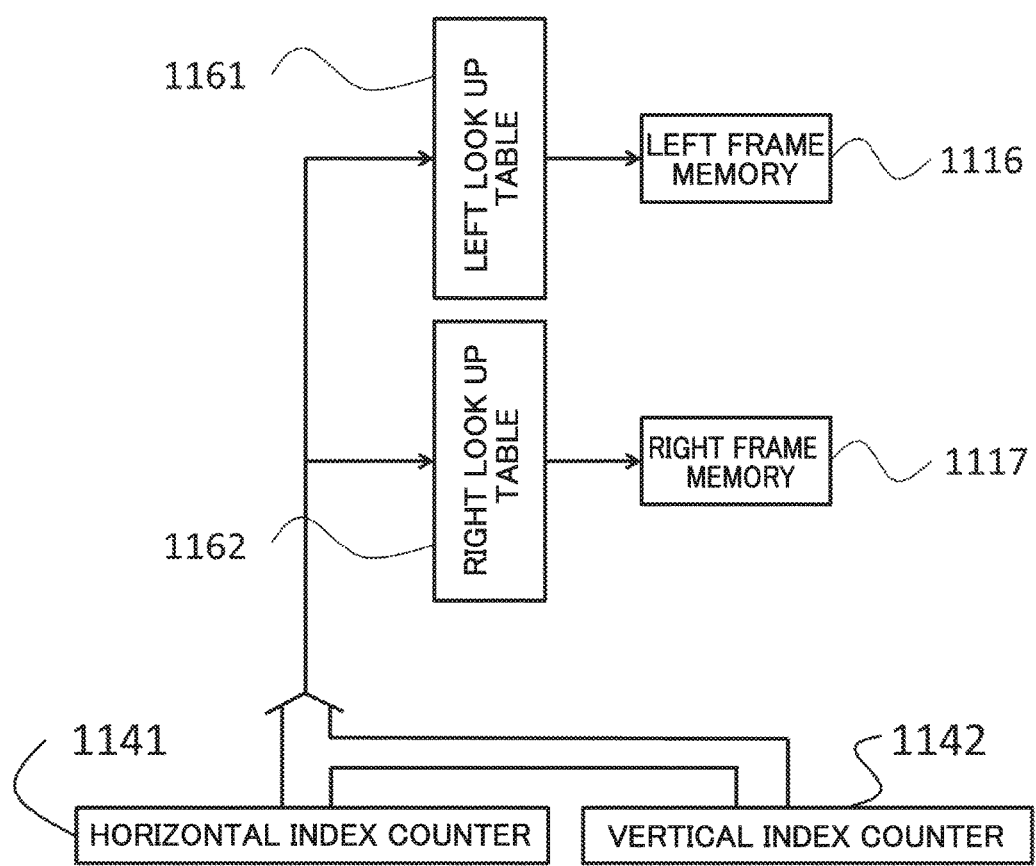

DISPLAY PLANE X

THREE-DIMENSIONAL VIDEO IMAGE DISPLAY PROCESSING DEVICE, VIDEO INFORMATION RECORDING MEDIUM, VIDEO INFORMATION PROVIDING SERVER, AND RECORDING MEDIUM STORING A PROGRAM

CROSS-REFERENCE TO RELATED APPLICATION

This application is based on and claims priority under 35 USC 119 from Japanese Patent Application No. 2016-220072 filed on Nov. 10, 2016, which is incorporated by reference herein.

BACKGROUND

Technical Field

The present disclosure relates to a display processing device that displays so as to give a viewer of a display a sense that a stereoscopic object is present. To do so, the display processing device is input with at least two items of video information, performs predetermined processing based on the items of video information, and displays a processing result on a stereo image display.

More precisely, the present disclosure relates to a display processing device that obtains images supplied in at least two continuous time series and sets one image out of these images as a main display image. In a calculation to ascertain a depth needed for stereo image display, by thinning out pixels to increase processing speed and being ingenious in which positions to take pixels from, the display processing device enables slight displacements between the two images subjected to depth-estimation calculation to be acutely reflected in the processing result, while maintaining a high resolution of source video.

Related Art

1. Current Situation Related to the Present Disclosure

Various approaches have recently been taken for achieving what is known as stereo viewing. Generally, in stereo viewing, images captured simultaneously by at least two cameras placed near to each other are processed by a computer, and when the processed images are shown to a viewer using a display device, the right eye and left eye of the viewer are presented with images that are slightly different from each other, so as to display the camera imaging subject stereoscopically.

Such devices can give the viewer a sense of realism and are, moreover, also useful in medical practice. For example, it is known that in surgical procedures using an endoscope, attaching a camera to a probe and inserting this into a patient's body enables surgery to be executed with narrower opening areas, contributing to a reduction in trauma to the patient.

In endoscopes, numerous ingenious ways are used for attaching imaging devices. The portion inserted into the body is made more compact and a further reduced in trauma realized by, for example, leading light received at the probe tip to the outside of the body using a focusing optical fiber lens such as a SELFOC (registered trademark) lens, a relay lens, or the like, and disposing an imaging device at the rear of the probe.

In addition to such ingenuity in device placement, there is also demand for ingenuity from a functional perspective in order to, for example, provide plural cameras to acquire a stereo image. Such functionality would enable an affected area inside a patient's body to be more quickly and accurately ascertained by a surgeon, and would further contribute to achieving reductions in trauma to the patient.

However, in such surgical procedures, plural doctors may have roles such as operating surgeon, instructor, and observer. In such cases, doctors who are not the direct operating surgeon in the operation are only able to observe the affected area inside the body by relying on images from a camera.

However, during the operation, merely viewing the image of the affected area alone is not enough when doctors assigned roles of observing or instructing need to consider the condition of the patient. Worries about the reproducibility of stereo images often makes the usage of head mounted displays (referred to as a "HMD" hereafter) problematic.

To address this point, technology has recently been proposed for displaying a multi-viewpoint stereo image on an ordinary, stationary, wall-hanging, flat-screen display that uses lenticular lenses. Use of such technology, unlike when a HMD is employed, is seen as enabling an observing doctor or the like, who is isn't assigned to the operation in a surgical situation, to not only ascertain the affected area, but to also naturally ascertain the state of the patient, either through other measurement equipment or directly, thereby achieving a further increase in the safety of the operation.

The inventor has studied the current situation in the above field of medical practice, and has investigated how to achieve a contribution to that field, and, hence, how to provide a general-purpose three-dimensional display device. The inventor is confident that such a device would also be implementable in aircraft engine maintenance, internal inspection and condition monitoring in nuclear power plants, internal monitoring at construction sites, ascertaining conditions under water, other industrial endoscopes, consumer entertainment devices, and the like.

2. Technological Classifications of Stereo Viewing According to Present Disclosure Technologies that implement stereo viewing can be broadly divided by technology:
A. Approaches for modeling objects (tangible objects) in a computer, and displaying the objects by generating an image from a viewer's viewpoint, as is widely employed recently in movies and games;
B. Approaches for imaging an object (a tangible object) using plural cameras having parallax to each other, estimating depth from the slight differences between the images captured by the cameras, and correcting display to the viewer based on the estimation; and
C. Approaches that combine the above two technologies.
Of these, the present disclosure belongs to approach "B".

3. Background Art Related to Present Disclosure

For example, Japanese Patent Number 2998791 has been proposed as related art to estimate depth based on images captured by plural cameras having parallax to each other.

In the technology in the disclosure of Japanese Patent Number 2998791, depth is estimated from images captured by two cameras, on the left and right. An image from one of the cameras is taken as a main image, an image from the other camera is taken as a secondary image, and a calculation is performed to estimate depth based on the secondary image. Although differences between the main image and the secondary image are employed in the calculation to estimate depth, the resolution of the main image and the resolution of the secondary image are different, and the approach is directed toward "enabling depth to be estimated over a wider field of view and with high accuracy, and enabling a high resolution image to be obtained for a partial field of view, which was not obtainable by traditional stereo methods while employing traditional stereo algorithms".

On the other hand, particularly in relation to disclosures estimating depth, there are proposals amongst stereo algorithms for technology underpinned by dynamic programming (referred to as "DP" hereafter).

For example, in the technology of the disclosure of Japanese Patent Application Laid-Open (JP-A) No. 2005-275482, a DP cost lattice space is generated by first stage DP matching in a vertical direction, correspondence relationships are found between image elements of two images by finding DP paths in the DP cost lattice space using second stage DP matching in a horizontal direction, and a calculation is performed to estimate the depth thereof. The technology is accordingly directed toward enabling the generation of an image as viewed at an arbitrarily selected viewpoint between the two images, and is not directed toward generating a three-dimensional model.

According to the technology of Japanese Patent Number 2998791, the advantageous effects described above can be anticipated, and, moreover, even when the main image is a high definition image, the actual processing time is thought to be tolerable without a significant increase in the calculation speed, as long as the resolution of the secondary image is suppressed to a given amount or lower.

However, providing cameras with different resolutions in the same imaging system has drawbacks such as: (1) when cameras of different resolutions are employed, their shapes are not uniform, making mechanical positioning difficult; and (2) manufacturing processes are more complicated than in cases in which the same imaging element is employed.

Further, if you consider a situation in which the main image is a high definition image and an image having a high spatial frequencies has been input, due to the secondary image having a lower resolution than the main image, objects having high spatial frequency components would not be able to be picked out. Moreover, due to the image display mainly employing the main image, the objects of the main image are perceived comparatively strongly by the human eye. Thus, even though the objects can be sharply ascertained by the viewer, it may not be possible to estimate the depth of these objects. Such cases result in the need to correct indistinct portions using some other sort of processing.

Further, although an image acquired from the low resolution camera can be obtained that is the same as an image that would be obtained by applying low pass filter processing to an image of the same scene captured by a high resolution camera, phase differences may arise between the image of objects obtained at high resolution and the image of objects obtained at low resolution. Depth errors may therefore arise when employing DP matching in the stereo algorithm. Accordingly, in situations in which the cameras are panned left and right, it is conceivable that the depth may repeatedly flick forwards and backwards during panning.

Next, consider JP-A No. 2005-275482. Although there is no clear physical significance, the first stage DP matching is thought to have at least a role in correcting vertical position misalignment between left and right cameras.

However, DP matching calculations are not suitable for parallel processing, and such processing may need to be performed sequentially even when employing a CPU capable of parallel thread processing. This has the drawbacks of requiring considerable CPU performance to perform DP matching processing in two stages.

SUMMARY

An aspect of the present disclosure is a three-dimensional video image display processing device that receives first video information and second video information. The second video information have a resolution that is substantially the same as the first video information and are simultaneously captured with the first video information at a position having parallax to the first video information. The three-dimensional video image display processing device causes a three-dimensional image to be displayed on a display by processing the first video information and the second video information. The three-dimensional video image display processing device includes: a first thinned image extraction section that specifies first discrete positions of respective pixels from the first video information, and that extracts pixels at the specified first discrete positions from the first video information; a second thinned image extraction section that specifies second discrete positions of respective pixels from the second video information, the second discrete positions corresponding to the first discrete positions specified by the first thinned image extraction section, and that extracts pixels at the specified second discrete positions from the second video information; a DP matching processor that sets a matching scan direction to a direction of a line segment connecting a viewpoint center of the first video information with a viewpoint center of the second video information, and that uses DP matching to obtain depth estimation information for the pixels extracted by the first thinned image extraction section and the second thinned image extraction section; and a display information generation section that generates movie display information for the display using video information of either the first video information or the second video information and using the depth estimation information obtained by the DP matching processor.

BRIEF DESCRIPTION OF DRAWINGS

FIG. 11 is a configuration diagram of peripheral configuration to a thinning extraction section in the fourth exemplary embodiment.

DESCRIPTION OF EMBODIMENTS

Figure 1:
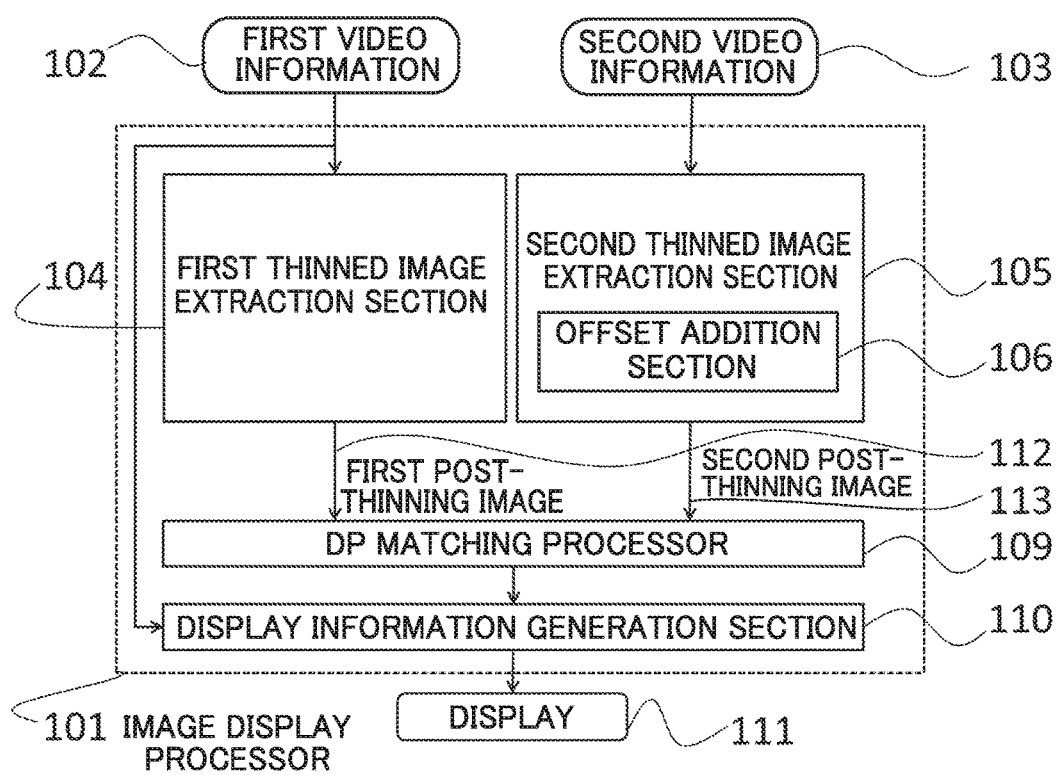
FIG. 1 is a schematic diagram regarding a method to solve the problem.

Exemplary embodiments for implementing the present disclosure will be described according to the contents below.
—Contents—
1. Common Items Across Exemplary Embodiments According to the Present Disclosure
   1.1. Regarding Terminology "Left" and "Right"
   1.2. Common Configuration Features
      1.2.1. Main Image During Display
      1.2.2. Image Employed in Depth Estimation
   1.3. Influence Reduction Target According to Exemplary Embodiments
2. First Exemplary Embodiment
   2.1. Video Information Input
   2.2. Display
   2.3. Frame Memory
   2.4. Thinned Image Extraction Section
      2.4.1. Base Address Determination Section
      2.4.2. Offset Addition Section
      2.4.3. Thinned Pixel Determination/Extraction Section
   2.5. DP Matching Processor
      2.5.1. Outline of DP Matching Processing
      2.5.2. Influence of Vertical Direction Misalignment in DP Matching Processing
      2.5.3. Influence of Horizontal Direction Misalignment in DP Matching Processing
      2.5.4. Drawbacks of DP Matching Processing Requiring Reverse Direction Searching
      2.5.5. Technique for Avoiding Reverse Progression Searching in Present Exemplary Embodiment
   2.6. Display Information Generation Section
   2.7. First Exemplary Embodiment Operation
3. Second Exemplary Embodiment
   3.1. Offset Addition Section
      3.1.1. Background and Significance of Offset Addition
      3.1.2 Offset Addition Section Peripheral Configuration
   3.2. DP Matching Processor
   3.3. Second Exemplary Embodiment Operation
4. Third Exemplary Embodiment
   4.1. Offset Addition Section
      4.1.1. Background and Significance of Offset Addition
      4.1.2. Offset Addition Section Peripheral Configuration
   4.2. DP Matching Processor
   4.3 Third Exemplary Embodiment Operation
5. Fourth Exemplary Embodiment
   5.1 Offset Addition Section
      5.1.1 Background and Significance of Look Up Table Implementation
      5.1.2 Offset Addition Section Configuration Employing Look Up Tables
   5.2 DP Matching Processor
   5.3 Fourth Exemplary Embodiment Operation
6. Video Information Recording Medium
7. Video Information Recording Server
   7.1 Server Outline Configuration
   7.2 Server Information Recording
8. Other
   8.1 Implementing and Executing Computer Program
   8.2 Alignment Error Calibration Method Proposal
   8.3 Brain Fatigue Countermeasures
9. Correspondence Relationships of Present Disclosure Wording
—Body—

1. Common Items Across Exemplary Embodiments According to the Present Disclosure First, items common to exemplary embodiments according to the present disclosure are discussed.

1.1. Regarding Terminology "Left" and "Right"

In the present disclosure, whether or not the cameras configuring the imaging system are disposed in a horizontal plane is immaterial. However, generally the viewer will view the display in the same environment as they would in their everyday life. Thus, in the description of the exemplary embodiments, to facilitate understanding it is assumed that two cameras configuring an imaging system are disposed in a horizontal plane, and these are referred to as "left" and "right" cameras. Accordingly, implementations are not limited to imaging systems configured by cameras in a horizontal plane.

1.2. Common Configuration Features 1.2.1. Main Image During Display

In each of the exemplary embodiments, from out of video information obtained from the imaging system, either the left or the right video information is employed on the display substantially as-is. Namely, the video information is represented on a display without performing inter-pixel calculations and with substantially no reduction in resolution.

1.2.2. Image Employed in Depth Estimation

In each of the exemplary embodiments, out of video information obtained from an imaging system, both the left and right items of video information are employed in a depth estimation. Images maintaining the resolution obtained from the imaging system are not generally employed in the depth estimation. The depth is estimated from thinned images resulting from sampling every predetermined interval.

1.3. Influence Reduction Target According to Exemplary Embodiments

Hereafter, exemplary embodiments according to the present disclosure are described in sequence. Characteristic parts of each exemplary embodiment and the target for reducing influence are given in advance in the following comparison table, in order to facilitate understanding.

TABLE 1

| Exemplary Embodiment | Offset Addition | Target |
|---|---|---|
| First | Horizontal only, fixed number | (1) Reduce influence of large parallax such as reverse parallax |
| Second | Horizontal and vertical, both fixed numbers | (1) Reduce influence of image system alignment errors in horizontal direction and vertical direction |

TABLE 1-continued

| Exemplary Embodiment | Offset Addition | Target |
|---|---|---|
| Third | Horizontal and vertical, both linear addition/subtraction calculations | (1) Reduce influence of image system alignment errors in horizontal direction, vertical direction, and twist direction |
| Fourth | Convert to look up table across entire region | (1) Reduce influence of image system alignment errors in horizontal direction, vertical direction, and twist direction (2) Reduce influence of distortion by lens aberration |

2. First Exemplary Embodiment

Figure 2:
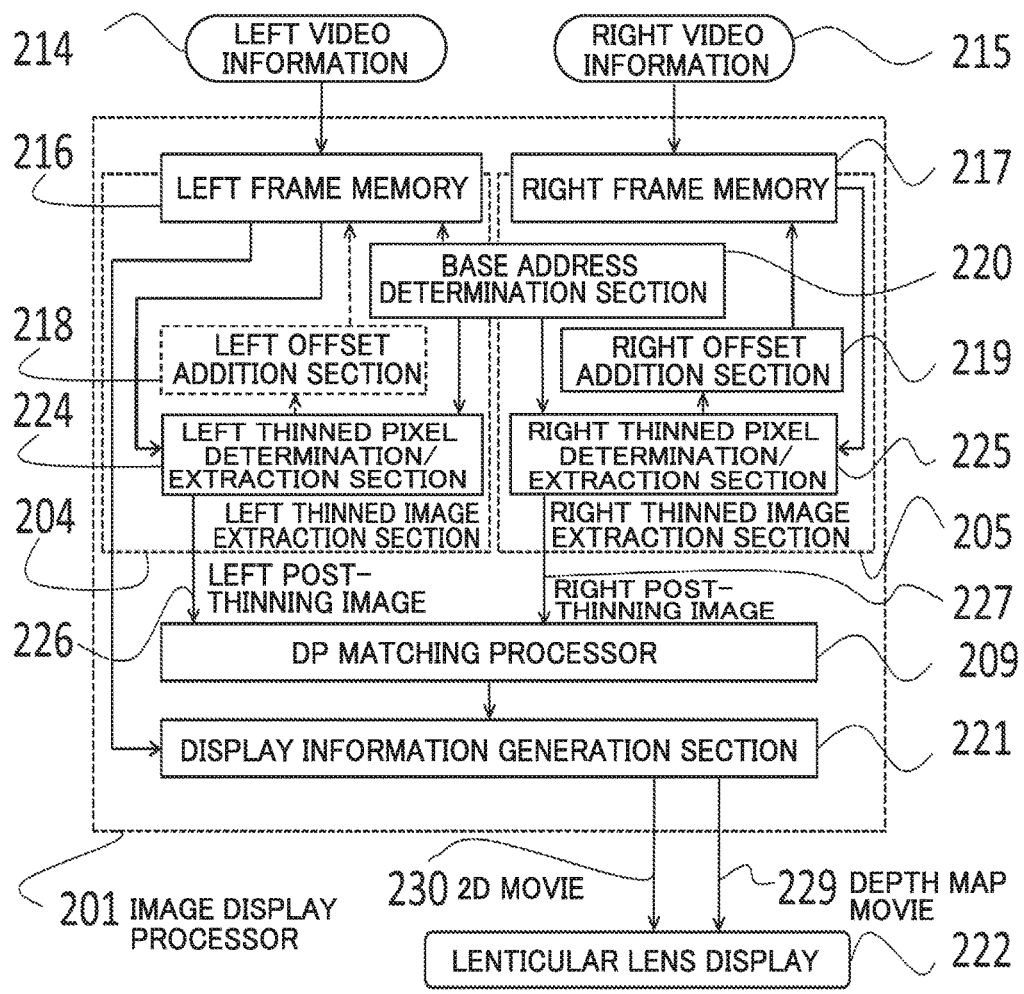
FIG. 2 is a configuration diagram of a first exemplary embodiment.
Figure 3:
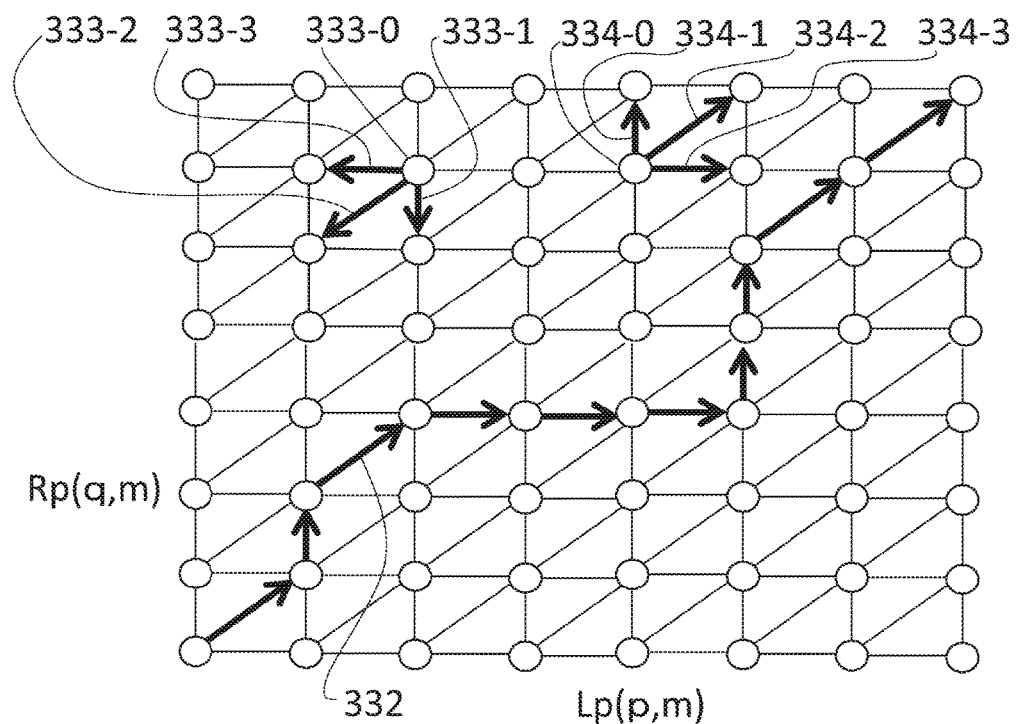
FIG. 3 is a conceptual diagram of DP cost path.
Figure 15A:
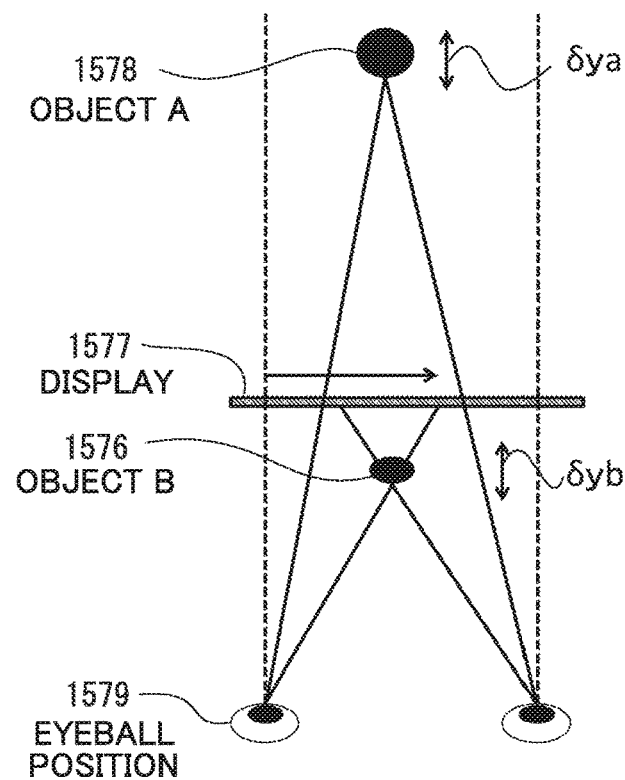
FIG. 15A and FIG. 15B are explanatory diagrams of relationships of positions where objects having standard parallax or reverse parallax should be displayed on a display.
Figure 15B:
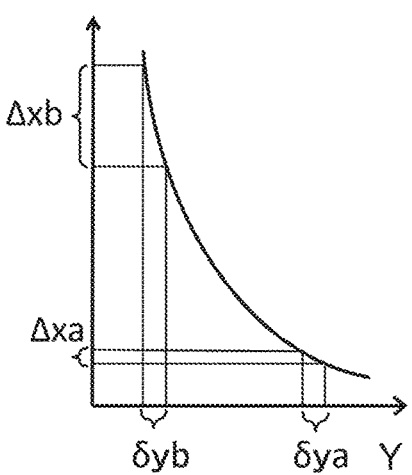

Next configuration of the present exemplary embodiment will be described, with reference to FIG. 2 and FIG. 3. FIG. 2 is a configuration diagram of the present exemplary embodiment. Further, FIG. 3 is a diagram illustrating the concept of DP cost path. Note that FIG. 1 is also mentioned when discussing a functionality perspective. Further, FIG. 15A and FIG. 15B are also mentioned when describing parallax.

A relevant section of the present disclosure is implemented by an image display processor 201, and the image display processor is input with left video information 214 and right video information 215 that serve as a basis for stereo viewing. Further, the processing result is output to a display 222.

2.1. Video Information Input

The left video information 214 and the right video information 215 are respective items of video information. The left video information 214 and the right video information 215 are simultaneously captured images having parallax to each other, and having substantially the same resolution as each other.

For example, they may be simultaneously captured images of an imaging subject captured by cameras installed in locations having parallax to each other. Further, as long as there is parallax present, simultaneous capture, and substantially the same resolution, instead of being images captured by cameras, a three-dimensional model may be held on a computer, and the video information generated therefrom employed.

Also included is video information such as movies recorded under the prerequisite of stereo viewing, as long as there is left-right separation.

Note that in the present exemplary embodiment, a case is explained under the prerequisite that the video information is video information acquired along a scan line in a horizontal direction (namely, by horizontal scanning), and when this scanning completes, vertical scanning is performed to scan the next row; however, the scanning method may be varied according to the frame memory.

2.2. Display

Three-dimensional display information resulting from processing by the image display processor 201 may be output to a display connected to the image display processor 201, and presented to a viewer.

Note that recently, naked eye, stereoscopic displays employing lenticular lenses have been sold commercially, and each of the exemplary embodiments may also employ such a display. Although naked eye, stereoscopic displays may employ any kind of input format, a prerequisite of the description in each exemplary embodiment is that the display employed is a type of display input with a 2D movie 230 and a depth map movie 229.

As a rule, such displays display the 2D movie 230, and within the display produce images that have parallax to each other based on the depth map movie 229. A two-dimensional movie is delivered to the left eye of the viewer of the display by the operation of a lenticular lens. Although two-dimensional images are likewise delivered to the right eye, a movie is delivered so as to have parallax to that of the left eye. Creating an accurate depth map movie in this manner enables the viewer of the display to perceive an imaging subject stereoscopically using the naked eye.

Namely, a three-dimensional video image display processing device to display a naked eye, three-dimensional video on such a display requires functionality to execute processing in real-time to send, from the respective left and right video information, the left video information as-is as a 2D movie, and to send information that has been converted into depth estimation information calculated from the left-right video information, in real-time as a depth map movie.

Normally such displays are imparted with what is known as multi-viewpoint, naked eye, stereoscopic image display functionality (functionality to generate images of an imaging subject as viewed from plural viewpoint positions and to display these images in different directions) using the operation of a lenticular lens, such that plural viewers viewing a single display can each perceive stereoscopicity.

2.3. Frame Memory

Frame memory is configured such that, as well as recording at least one frame worth of inputted video information, pixels can also be read from a designated location (address).

Reading designated addresses is not accomplished by successively accessing widely separated positions, and is restricted to accessing data separated by no more than several rows at the most. Accordingly, when reading a designated address, there is no need to be able to perform perfectly random access, though this is useful in practice. The memory may be implemented as a streamline buffer configuration in which plural stages of shift registers are connected together in series.

Left frame memory 216 and right frame memory 217 are both provided in the present exemplary embodiment, since both the left video information 214 and the right video information 215 are input.

2.4. Thinned Image Extraction Section

Next, a thinned image processor will be described. In the present exemplary embodiment, a left thinned image extraction section 204 and a right thinned image extraction section 205 are implemented.

A left thinned pixel determination/extraction section 224 and, if necessary, a left offset addition section 218 are provided in the left thinned image extraction section 204.

Further, a thinned pixel determination/extraction section 225 and an offset addition section 219 are provided in the right thinned image extraction section 205.

A base address determination section 220 is provided together with the thinned image extraction sections, and an address determined by the output thereof is employed by both the left thinned image extraction section 204 and the right thinned image extraction section 205.

Both the left and the right thinned image extraction section retrieve video information from the frame memory, thin the read video information using a predetermined method, and pass the result to a DP matching processor 209 for depth estimation.

The DP matching processor, described later, generally performs processing on images having the same resolution as each other, and is therefore implemented by a left thinned image extraction section 104 and a right thinned image extraction section 105, corresponding to the left frame memory 216 and the right frame memory 217, respectively. Note that a left offset addition section is not necessary in cases in which manufacturing is performed with high accuracy camera alignment of the imaging system.

2.4.1. Base Address Determination Section

Each time the base address determination section 220 acquires, from the frame memory, pixels to be employed in depth estimation by the left and right thinned image extraction sections, the base address determination section 220 generates and determines a base read position for the pixels. Further, the base address determination section 220 may set the location (pixel) designation address for when reading, from the left frame memory, information that will serve as the basis for the 2D movie information.

Due to the video information being underpinned by horizontal scanning, the present exemplary embodiment may be implemented as long as the base address determination section 220 includes a horizontal direction counter and a vertical direction counter.

2.4.2. Offset Addition Section

An offset addition section 106 adds a predetermined offset to a read location determined by the base address determination section 220. The effect of offset addition varies greatly depending on how the offset value is employed.

In the first exemplary embodiment, a positive constant is set as the offset value for the horizontal direction.

It is usually sufficient for the offset addition section 219 to be implemented in one out of the left or right thinned image extraction sections 104, 105. Regarding this point, the offset addition section 219 is preferably implemented by the thinned image extraction section on the opposite side to the side where an image is passed to a display information generation section substantially as-is. This is because it is desirable to display such a source image on the display as-is, insofar as is possible. Further, the primary range desired to be displayed from out of the source image captured by the primary left and right cameras, the manufacturing accuracy of the imaging system, and other reasons are also factors to be considered.

The inclusion of the offset addition section 219 is meaningful when, for example, there is a limitation to the number of calculated bits or the like of the addition section, due to other limitations in the hardware implementing the offset addition section 219.

2.4.3. Thinned Pixel Determination/Extraction Section

The left thinned pixel determination/extraction section 224 extracts a thinned image from the left frame memory 216 recorded with the left video information 214. Similarly, the right thinned pixel determination/extraction section 225 extracts a thinned image from the right frame memory 217 recorded with the right video information 215.

When the base read position determined by the base address determination section 220 is the address of a pixel to be extracted by the thinning processing, the pixel corresponding to the pixel position is retrieved from the frame memories.

When doing so, the read address is passed to the offset addition sections 218, 219, and is determined after addition of the predetermined offset.

A collection of pixels extracted from each frame memory can be treated as a single item of video information. Namely, the collection of pixels is a "post-thinning image". The post-thinning image has a size smaller than the size of the original video information by the size of the pixels that have been thinned out. Note that since this extraction is not reduction using a filter such as a low pass filter, pixels to be extracted are picked out with their brightness values and the like unmodified from those of the source video information.

2.5. DP Matching Processor

The DP matching processor 209 acquires the post-thinning images from the left and right thinned image extraction sections 204 and 205, and performs pattern matching processing thereon based, in principle, on dynamic programming using scan lines having the same height, so as to detect slight left-right displacement in corresponding pixels. The result is then passed as depth estimation information to a display information generation section 221 in a following stage.

The content of the processing will now be described in detail, with reference to FIG. 3. FIG. 3 is a schematic diagram of DP cost path.

2.5.1. Outline of DP Matching Processing

Stereo viewing gives the viewer of a display a sense of stereoscopicity as a result of left-right displacement between the same portion of objects captured in the left and right images.

When installing the cameras as described above (in 1. Common Items Across Exemplary Embodiments According to the Present Disclosure), the direction of a line segment connecting a viewpoint center of left video information and a viewpoint center of right video information, and the scan direction, are the same direction. Then, paying attention to horizontal scan lines at the same height position in the left and right video information, displacements in corresponding points of the same captured object contribute the most to creating parallax in the left and right eyes of the viewer of the display. Accordingly, it is known that the necessary depth estimation for the left and right video information can be achieved by finding such displacements between corresponding points of the same object between horizontal scan lines at the same height position.

Given this background, in the present exemplary embodiment, DP matching processing is performed to detect displacements between corresponding points of the same object. Although the DP matching processing is an algorithm that determines the similarity between two images, finding a DP cost path 332 is the same calculation as that for finding such displacements, and so this means that DP matching processing can be employed as-is.

More precisely, the video information presented to the left eye and the video information presented to the right eye configures a (p, q) matrix on the horizontal axis and the vertical axis, wherein pixel data rows on horizontal scan lines at the same height position m are denoted $Lp(p, m)$ and $Rp(q, m)$, respectively. Here, p and q are horizontal positions of the video information presented to the left eye and the video information presented to the right eye, respectively, and are arbitrary numeric values having a maximum value that is the number of horizontal pixels subjected to the DP matching processing. Hereafter, a matrix for processing corresponding horizontal pixels for a specific height position (i.e. "row") m in this manner is simply referred to as a "penalty matrix" in the present specification.

Next, the cost of each lattice point in the penalty matrix is found by taking the difference between the information of the pixels that created each lattice point. Namely, $|Lp(p, m) - Rp(q, m)|$. A path 332 is selected from the lower left (0, 0) to the upper right (p max, q max) of the matrix so as to arrive at minimum cost. For example, when considering a first start point 334-0, candidate paths are a path taking a horizontal direction forward-stationary progression path 334-3, a vertical direction stationary-forward progression path 334-1, and a diagonally upward direction forward-forward progression path 334-2.

Note that there is no need to take any reverse paths here. This is discussed in 2.5.4. Drawbacks of DP Matching Processing Requiring Reverse Direction Searching.

Since it is known that where the tracked path 332 takes a forward-stationary progression path means that there is displacement to the right, and where the tracked path 332 takes a stationary-forward progression path means that there is displacement to the left, the depth can be estimated on this basis.

Note that although the DP path here only undergoes stationary progression or forward progression for each single pixel, observable objects are normally continuous, and this contributes to stereoscopic viewing, such that there is little need to track points where sites are not continuous for long (namely, discontinuous points).

An action of the brain is to subconsciously perceive stereoscopicity from changes to an object along the time axis direction. For example, it is known that when a video of a "Nebuta festival", in which a "Nebuta" float is paraded down a road while rotating about a vertical axis, is viewed using just one eye, this is still sufficient to perceive a three-dimensional shape of the "Nebuta" float. Since viewing is performed with just one eye, this is obviously not an effect from stereo viewing. It can thus be confirmed that the brain behaves so as to ascertain three-dimensionality from changes in an object along the time axis direction.

Data used for DP matching in the present exemplary embodiment is the post-thinning images rather than the source video information. This helps to speed up processing. In addition, since videos are being handled, and a combination is utilized of brain processing to perceive stereoscopicity from changes in an object along the time axis direction as described above, with brain processing to subconsciously interpret so as to maintain continuity even when there are momentary prediction failures, the usefulness thereof is apparent.

2.5.2. Influence of Vertical Direction Misalignment in DP Matching Processing

The influence of vertical direction misalignment in DP matching processing is now considered.

For example, vertical direction misalignment may arise between the image captured by the left camera and the image captured by the right camera due to the influence of mounting accuracy and the like. More precisely, suppose the left camera is installed at a higher position than the right camera.

In such a case, if there was an object B behind an object A having an edge extending in the horizontal direction, and if images were captured in circumstances such that these objects were visible, a scan taken at a position slightly higher than the edge of the object A, as would be captured by the left camera, would capture an image of the object B with the left camera. On the other hand, the right camera, being at a lower position than the left camera, would already capture an image of the object A at this point. As a result, different objects would be seen on this horizontal scan line in the right camera and the left camera, and depth estimation would fail.

In consideration of such a scenario, in processing algorithms for stereo viewing applying DP matching, generally filter processing, such as taking an average value in the vertical direction, is performed as pre-processing to DP matching, as a technique to reduce such influence.

Although such a technique is not applied in the present exemplary embodiment, such countermeasures are applied in the second exemplary embodiment onward, as described below.

2.5.3. Influence of Horizontal Direction Misalignment in DP Matching Processing

The influence of horizontal direction misalignment in the DP matching processing is now considered.

Ordinarily, when horizontal direction misalignment occurs, when misalignment occurs at the start point, matching is performed by iterating to see if the cost path continues by forward-stationary progression or by stationary-forward progression. However, depending on the scenario, the cost may be too great and the matching may fail.

Furthermore, this also creates problems when, for example, images are captured with reverse parallax.

This point will now be explained with reference to FIG. 15A and FIG. 15B. FIG. 15A and FIG. 15B are diagrams of relationships between positions where objects having standard parallax or reverse parallax should be displayed on a display.

FIG. 15A illustrates where to display images at their respective positional relationships to the display when an object A 1578 positioned far from an eyeball position 1579 and an object B 1576 positioned close to the eyeball position 1579 are viewed. FIG. 15B is a graph illustrating the extent to which images of the object A and the object B must be moved to the left and right on the display when the object A is moved by a small amount $\delta ya$ forward or backward and the object B is moved a small amount $\delta yb$ forward or backward.

As is clear from the graph, a small left-right displacement ($\Delta xa$) on the display is sufficient to move an object further away than the screen by a small amount ($\delta ya$) forward or backward. However, a sizable left-right displacement ($\Delta xb$) needs to be made on the display to move an object closer than the screen by a small amount ($\delta yb$) forward or backward. Namely, when an imaging subject is close, the image for the left eye is moved in a positive direction and the image for the right eye is moved in a negative direction, and this is a proportionally much greater movement for reverse parallax cases to represent objects closer than the display.

Some stereoscopic movies are distributed as reverse parallax images, however, due to the circumstances described above, when these are input as video, matching is not achieved due to the large misalignment. In such an event, techniques should perhaps be considered that allow reverse progression of the cost path.

2.5.4. Drawbacks of DP Matching Processing Requiring Reverse Direction Searching Regarding this point, allowing reverse progression in situations like that described above means choosing a candidate path from a second start point 333-0 that takes a direction diagonally left and down 333-2, in addition to candidate paths in the horizontal direction 333-3 and the vertical direction 333-1. Moreover, the addition of a path in the direction diagonally left and up should perhaps be considered.

However, this has a major drawback. Namely, as the number searching directions increases, there is an exceedingly large increase in the number of conceivable paths. This deviates from the original purpose of the DP algorithm.

Even were this to be allowed by employing an algorithm other than DP, accepting reverse progression searches would result in re-entry to paths previously followed. In such situations the same path would be followed once again, resulting in an infinite loop. To avoid this, a large number of complicated conditional branches would be needed during path determination in order that duplicate paths were not followed again.

This is not acceptable for video processing that needs to be processed in real-time.

2.5.5. Technique for Avoiding Reverse Progression Searching in Present Exemplary Embodiment In the present exemplary embodiment, the reading position to read the right post-thinning image is intentionally shifted by the offset addition section.

Since the need for reverse progression searching as described above primarily arises when attempting to display videos recorded with reverse parallax images, if there is variation in the camera installation then this can be ascertained in advance so as to make an equivalent offset.

However, even if a stereoscopic movie is recorded with reverse parallax images, a stereoscopic image may no longer be constructible in the brain if there is a significantly large parallax, and so parallax should be constrained to within a fixed range. Failures after the start of matching can be reduced as long as matching between left and right video information can be achieved for images in which there is a maximum value or a minimum value of left-right displacement between the respective corresponding pixels in the scene, including videos that intentionally apply excessive parallax to obtain stereoscopic effects, namely, by taking an offset value equivalent to the parallax between the left and right post-thinning images at the maximum parallax or the minimum parallax.

In the present exemplary embodiment, the problems arising in situations in which reverse parallax images are processed are avoided by applying an offset value so as to minimizes matching failures in a situation in which the maximum value or the minimum value is obtained by the operation of the offset addition section.

2.6. Display Information Generation Section

The display information generation section 221 prepares a format displayable on a lenticular lens display 222 based on the depth estimation information obtained by the DP matching processor and the left video information. More precisely, the content of the left frame memory and the depth estimation information are converted so as to be output as a 2D movie 230 and a depth map movie 229.

In the present exemplary embodiment, the left video information is employed as the 2D movie substantially as-is. If DP matching processing takes several frames worth of processing time, then a frame buffer of the processing time needed therefor is provided, so that the left video information corresponding to the original post-thinning image that was subjected to DP matching processing is synchronously output to the display.

2.7. First Exemplary Embodiment Operation

Next, the present exemplary embodiment will be described from the viewpoint of the flow of video information.

Left and right video information 214, 215 obtained from a digitally recorded recording medium, an information distribution server that distributes digital video, a stereo camera, or the like is temporarily accumulated in left and right frame memories 216, 217.

Of the video information accumulated in the frame memories, the left video information is employed in depth estimation and to generate display information for display. Further, the right video information is employed for depth estimation. When this is performed, the base address determination section 220 determines the base read position from which to perform scan-wise sequential reading of the video information accumulated in the frame memories 216, 217. The determined base read position is directly applied as the read position of the left frame memory 216, and the video information read from the frame memory serves as a basis for 2D movie generation by the display information generation section 221.

However, the information recorded in the frame memories is also subjected to thinning processing by the left thinned pixel determination/extraction section 224 and the right thinned pixel determination/extraction section 225. In this event, a read position for the video information recorded in the right frame memory is set by the right offset addition section 219 such that reverse progression searching is not required in the DP matching processor by the right offset addition section 219 adding an offset.

The depth is then estimated by the DP matching processing based on the post-thinning images that have been read.

The estimated depth is synchronized with the video information recorded in the left frame memory and sent to the display, so as to provide the viewer with a stereoscopic image.

Note that the relationships between each item of information are summarized in the table below, in order to facilitate understanding of the basic information needed in each processing.

TABLE 2

| Information Name | Basic Information | Read Address | Required Processing |
|---|---|---|---|
| 2D movie | Left video information | Base address | Employed substantially as-is |
| Depth map movie | Left post-thinning image Right post-thinning image | | DP matching |
| Left post-thinning image | Left video information in left frame memory | Base address, thinned, left offset | |
| Right post-thinning image | Right video information in right frame memory | Base address, thinned, right offset | |

3. Second Exemplary Embodiment

Figure 4:
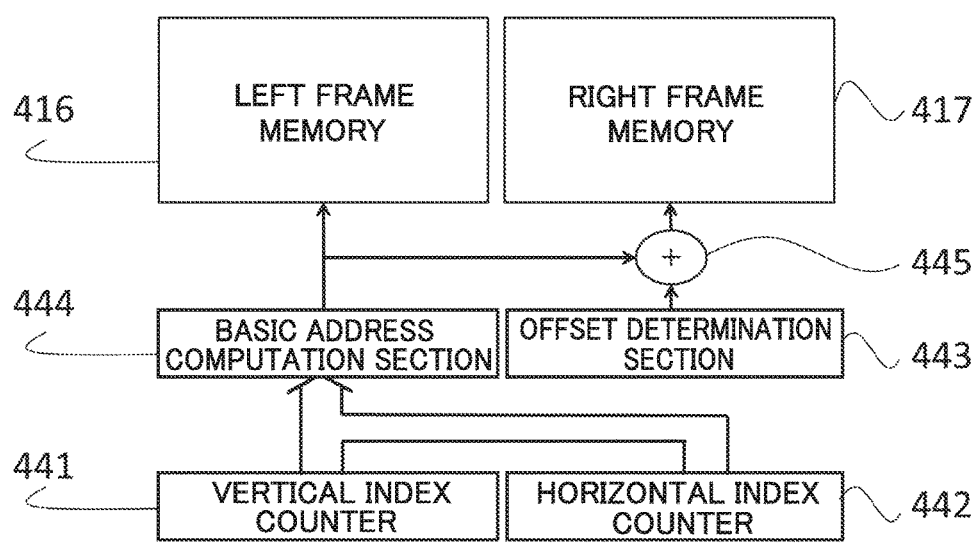
FIG. 4 is a configuration diagram of peripheral configuration to a thinning extraction section of a second exemplary embodiment.

Next, a second exemplary embodiment will be described, with reference to FIG. 4 to FIG. 6.

The second exemplary embodiment is the first exemplary embodiment in which peripheral configuration to the offset addition section have been modified so as to enable accurate depth estimation even in imaging systems in which precise mounting of cameras is difficult and misalignment arises.

More precisely, the base address determination section 220, both of the offset addition sections 218, 219, and the thinned pixel determination/extraction sections 224, 225 of the first exemplary embodiment are modified. The modified sections are now discussed, with description of common sections omitted.

3.1. Offset Addition Section 3.1.1. Background and Significance of Offset Addition The accuracy of the mounting process for the left and right cameras configuring the imaging system has an influence on the vertical direction misalignment between left and right processing-target images when performing depth estimation using a penalty matrix.

A prerequisite of the present disclosure is that the left and right cameras employed have the same resolution as each other. This resolution is high, and since, in addition, thinning processing is performed in the depth estimation processing, the mounting accuracy accordingly has large influence on the depth estimation processing.

However, increasing the mounting accuracy causes an increase in costs for implementation, and an effective countermeasure is therefore desired to use when accuracy is at an appropriate level in relation to the finished product.

3.1.2 Offset Addition Section Peripheral Configuration

The present exemplary embodiment addresses the background situation to the offset generation. Description follows with reference to FIG. 4. FIG. 4 is a configuration diagram of peripheral configuration to a thinning extraction section of the second exemplary embodiment.

A horizontal index counter 442 is a counter for determining the horizontal direction position when reading pixel information according to video from the left frame memory, and is configured such that a counter value thereof is incremented (+1) as scanning is performed in the horizontal direction.

A vertical index counter 441 is a counter for determining the height direction position when reading pixel information according to video from the left frame memory, and is configured such that a counter value thereof is incremented (+1) as scanning is performed in the vertical direction.

A base address is indicated by the vertical index counter 441 and the horizontal index counter 442. Accordingly, by implementing a counter having higher order 10 bits as the vertical index counter 441 concatenated with lower order 10 bits as the horizontal index counter 442 enables display/video input at a resolution of 1920×1080, known as Full-HD.

The left frame memory 416 and the right frame memory 417 are each the same as in the first exemplary embodiment.

A basic address computation section 444 generates a memory address for reading from the left frame memory based on the value of the vertical index counter 441 and the horizontal index counter 442, and supplies the memory address to the display information generation section 221 to perform reading. The pixels read after the memory address has been identified in this manner are supplied to the DP matching processor.

The basic address computation section 444 also finds the memory addresses of post-thinning read positions, based on the values of the vertical index counter 441 and the horizontal index counter 442. For example, if one pixel in three pixels is to be extracted, then addresses where dividing the vertical index counter 441 and the horizontal index counter 442 by three gives a remainder of a predetermined number (predetermined as 0, 1, or 2) are determined to indicate thinned pixels, and these addresses are supplied to the left frame memory as the read addresses for the left frame memory 416.

An offset determination section 443 holds independent constants for the vertical direction and horizontal direction, such that these constants can be referenced by an address addition section 445. Here, horizontal direction offset constants are always positive, and both positive and negative values may be taken in the vertical direction.

Of these constants, the vertical constant employs a value measured for each individual imaging system after imaging system construction. Thus, when the present three-dimensional video image display processing device displays, as the imaging subject, a video captured by an unspecified camera, preferably the vertical offset is a value that is rewritable, and is a value that is determined for each video to be displayed and is set from outside the device. In such cases, although manual input by an operator may be employed, preferably values measured for each imaging system are supplied, such as by an information medium or an information providing server, as described later, and registered as the offset values, since that reduces the burden on the operator.

The address addition section 445 adds the constant obtained by referencing the offset determination section 443 to a memory address serving as the post-thinning read position of the basic address computation section 444. When doing so, values may be added in the vertical and horizontal directions. The basic address computation section designating the memory address of pixels to be thinned and extracted results in discrete values being designated every thinning number; however, the addition is performed on the original numeric values from the basic address computation section 444.

3.2. DP Matching Processor

There is no particular need to modify the DP matching processor in the present exemplary embodiment from that of the first exemplary embodiment.

Note that although the left post-thinning image supplied to the DP matching processor is an image resulting from simply arranging the left source video information at even spacings in the vertical and horizontal directions, the right thinned image is an image resulting from arranging the right source video information to which an offset has been applied at even spacings in the vertical and horizontal direction.

3.3. Second Exemplary Embodiment Operation

Figure 5A:
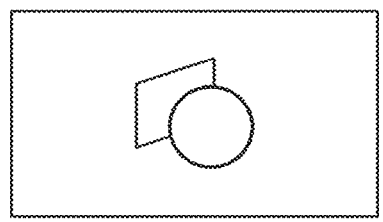
FIG. 5A to FIG. 5C are explanatory diagrams for an example of an offset situation arising in the second exemplary embodiment.
Figure 5B:
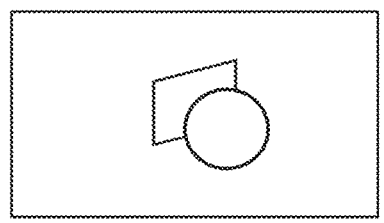
Figure 5C:
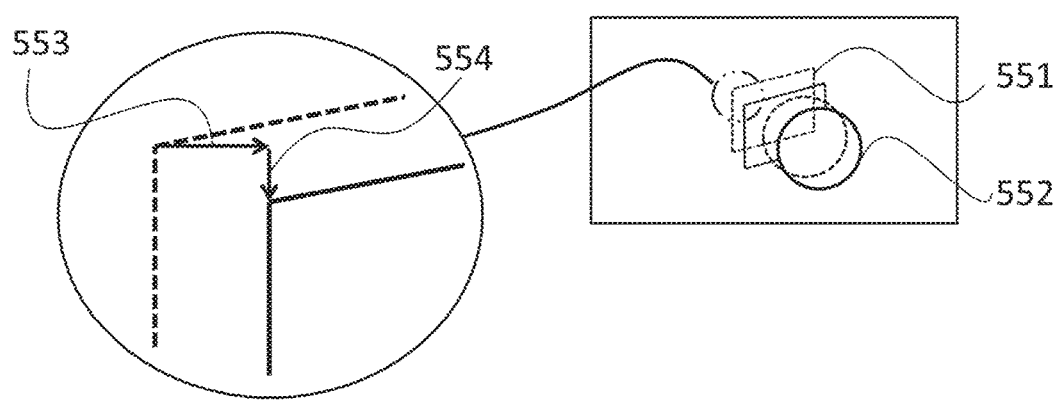

The operation of an embodiment applying the above configuration will be described, with reference to FIG. 5A to FIG. 5C and FIG. 6. FIG. 5A to FIG. 5C are explanatory diagrams of an example of an offset situation arising in the second exemplary embodiment. FIG. 6 is an explanatory diagram of an example of thinning operation in the second exemplary embodiment.

In the left video information illustrated in FIG. 5A and the right video information illustrated in FIG. 5B, when a rearward object is hidden by a forward object or the like, apart from objects that appear in only one of the images, the front-rear relationship between objects caused by parallax alone, and not from up/down misalignment, is preferably represented as left-right displacement. Namely, FIG. 5A and FIG. 5B, which are preferable images, are both images of a sphere in front of a plate, and if you pay attention to the vicinity of the apex of the sphere, then there is a slight difference in relationship to the vertical edge line at the right end of the plate, with the position of the sphere apex in the right video information imaged further away from the vertical edge line at the right of the plate. Thus when the left and right video information are viewed by the left eye and the right eye, respectively, the brain of the viewer is able to recognize the front-rear relationship between the plate and the sphere due to this slight difference.

However, an image captured with an imaging system having a left-right up-down misalignment produces an image like that of FIG. 5C. Namely, instead of an expected image 551, the vicinity of the objects being looked results in an image 552 that largely reflects the horizontal misalignment 553 and vertical misalignment 554 due to the misalignment of the cameras. To address this, in the offset determination section, the index counter 442 acts in the direction to correct vertical misalignment, such that vertical direction alignment integrity can be maintained.

Obviously, misalignment may also arise in the horizontal direction in such an imaging system.

However, horizontal direction misalignment can be ignored in consideration of:

(1) the formulaic characteristics of the way in which a stereoscopic object is reconstructed in the brain due to parallax;
(2) the practical characteristic that the depth information is important for the relative front-rear relationships of plural objects to be displayed as images, and being able to calculate absolute value of depth has no real significance.

Thus, as pointed out in the description of the first exemplary embodiment, reducing DP matching processing errors caused by reverse parallax by horizontal direction offset addition is important. Thus, the horizontal direction offset is set for the reason indicated in the first exemplary embodiment.

This approach is adopted for the reason of making the horizontal direction offset constant of the offset determination section 443 only take positive values, while both positive and negative values can be taken in the vertical direction.

Note that since misalignment is an error in the relative positions of the left and right cameras of the imaging system, but should not be seen as being a need to apply an offset in particular to the left frame memory 416.

Figure 6:
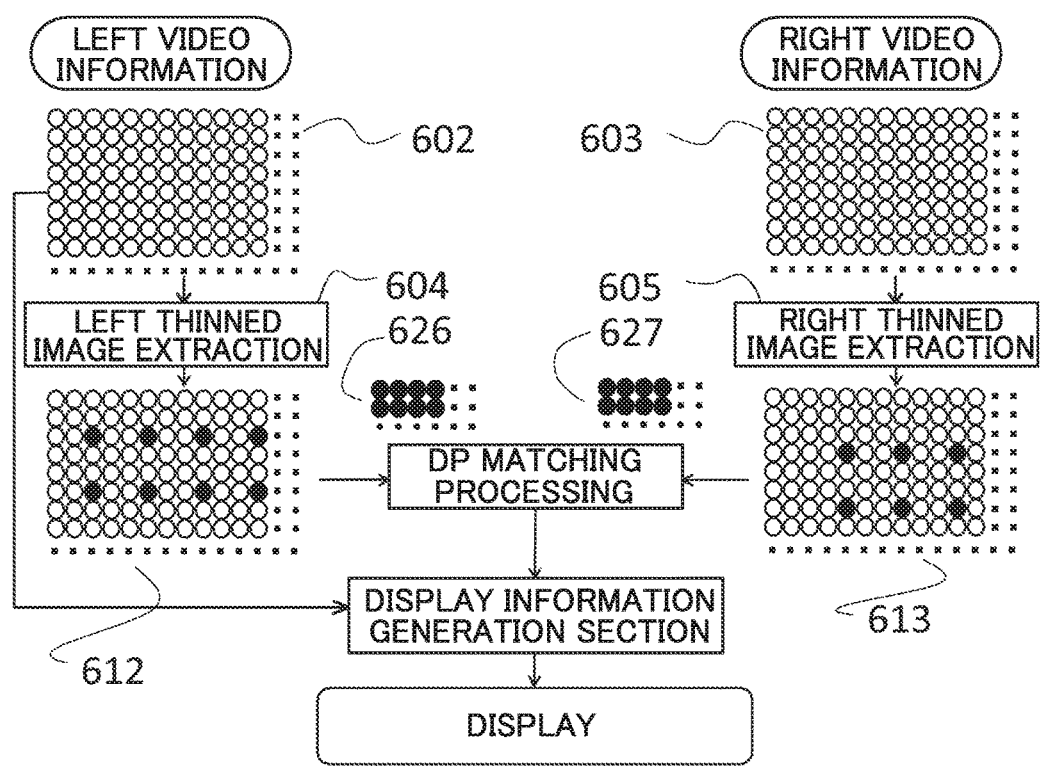
FIG. 6 is an explanatory diagram for an example of thinning operation in the second exemplary embodiment.

Now consider the video information, which may be summarized simply using FIG. 6. Note that FIG. 6 illustrates a case in which the vertical direction alignment is misaligned by +1 pixels worth in the right camera.

Left and right video information 602, 603 obtained on the left and right is converted into left and right post-thinning images 626, 627 by thinned image extraction sections 605, 606. When doing so, as a result of the offset addition operation, discrete items of source video information are extracted from the left and right source images to obtain pixels 612, 613 indicated by black dots in the drawings. These are subjected to DP matching processing and display information generation processing and then output to the display.

As described above, in the present exemplary embodiment, as a result of the operation of the offset addition section, problems arising from misalignment of the cameras in the up-down and left-right directions are avoided, and valid depth estimation can be performed even in situations where there is reverse parallax.

4. Third Exemplary Embodiment

Figure 7:
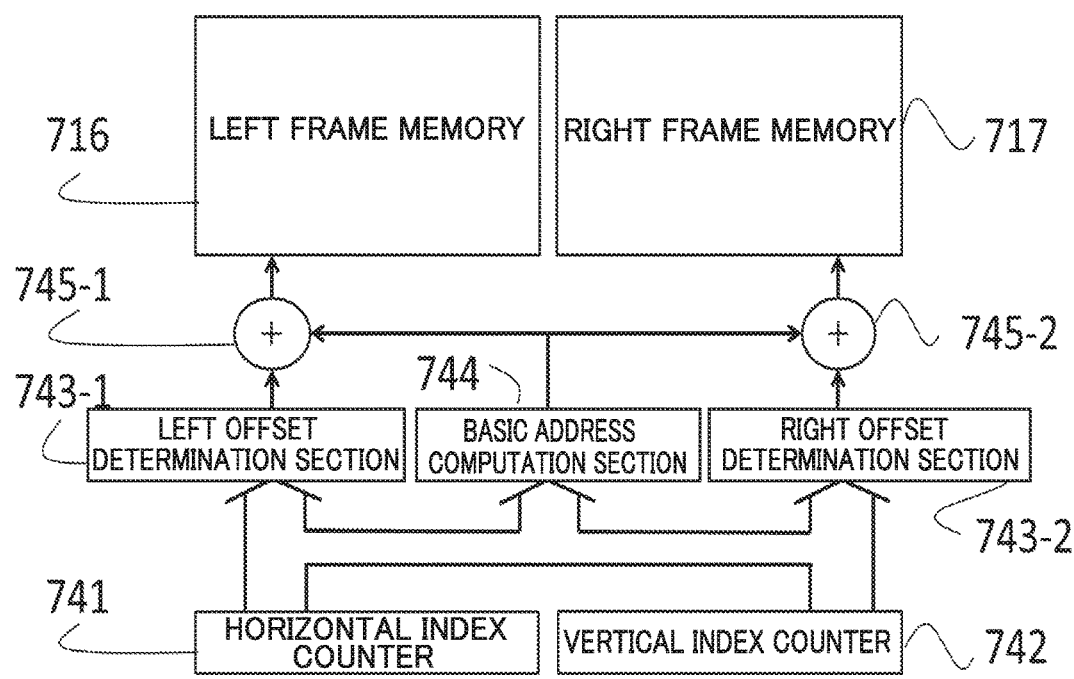
FIG. 7 is a configuration diagram of peripheral configuration to the thinning extraction section of the third exemplary embodiment.

Next, a third exemplary embodiment will be described, with reference to FIG. 7 to FIG. 9.

Similarly to the second exemplary embodiment, in the third exemplary embodiment, precise mounting of the cameras is difficult, and peripheral configuration to the offset addition section is modified to enable accurate depth estimation even when misalignment arises in the imaging system. The main way the third exemplary embodiment differs from the second exemplary embodiment in that a tilting component is also considered in the alignment. More correctly, alignment error in a rotational direction about an axis in a direction normal to an imaging plane of a camera of the imaging system is considered.

In the present exemplary embodiment, although the configuration is substantially the same as the second exemplary embodiment, the configuration and operation of peripheral configuration to the offset determination section differ.

4.1. Offset Addition Section

In depth estimation using a penalty matrix, tilting of the cameras is a factor that imparts an influence on vertical direction misalignment between left-right processing-target images.

In the third exemplary embodiment, out the alignment error originating from mounting accuracy of the left and right cameras, attention is given to the tilting direction of the cameras and this is dealt with. In such cases, the vertical direction misalignment increases with distance toward the periphery from the image center. The present exemplary embodiment deals with such vertical direction misalignment.

4.1.1. Background and Significance of Offset Addition

Similarly to the second exemplary embodiment, the present exemplary embodiment also deals with vertical direction misalignment. Since the misalignment to be dealt with by the present exemplary embodiment is misalignment that increases on progression toward the periphery, simply adding a constant like in the second exemplary embodiment is not sufficient.

Regarding this point, a technique of counter-type offset addition is conceivable, in which an offset of 1 pixel worth in the vertical direction is simply added (or subtracted) each time a number of pixels are advanced in the horizontal direction.

However, such a techniques presents difficulties. Namely, although the moving distance is simply n when n pixels have been advanced in the left video information, the corresponding length traveled in the right video information is SQRT (n×n+1) worth. In the present display processing device for inducing a stereoscopic sensation using slight left and right differences, such a difference can be a critical flaw.

On the other hand, there are methods for affine transformation on the source image to adjust scaling. However, adopting such an approach drastically increases the volume of calculations and gives rise to a need to use a dedicated processor, or the like.

Accordingly, in the present exemplary embodiment, an offset is added to both the left and right memory extraction locations so as to stretch the post-thinning images of the left and right video information by the same scaling. More precisely, when there is a rotational direction misalignment about the axis in a direction normal to the imaging plane of the cameras of the imaging system (a misalignment angle θ), an offset is produced to give an offset of θ/2 with respect to the horizontal plane for both of the offset additions. Detailed explanation of the configuration follows. Although the images that are thereby read from both the left and right frame memories are stretched to SQRT(n×n+1) times the actual length on the scan line, the occurrence of left-right failures during DP matching processing can be reduced since the scaling is performed to the same extent on the left and right.

4.1.2. Offset Addition Section Peripheral Configuration

The present exemplary embodiment deals with the background circumstances behind the occurrence of such offsets. Description follows with reference to FIG. 7. FIG. 7 is a configuration diagram of peripheral configuration to the thinning extraction section of the third exemplary embodiment.

A left frame memory 716, a right frame memory 717, a horizontal index counter 741, a vertical index counter 742, a basic address computation section 744, and an address addition section 745 are configured the same as in the second exemplary embodiment and have the same operation, and descriptions thereof are therefore omitted.

Left and right offset determination sections 743-1, 743-2 output values for read positions in the frame memories such that the absolute value of the offset increases on progression along with scanning in the vertical direction and the horizontal direction. Thus the left and right offset determination sections 743-1, 743-2 change the offset value according to the base read positions determined by the vertical and horizontal index counters, respectively. The result is added to or subtracted from the output of the basic address computation section.

In this event, the offsets determined by left the offset determination section and the right offset determination section give a predetermined tilt with respect to the basic addresses, which are abstractly perfectly horizontal, and the trend is such that the offset has the same values on the left and right, but with different signs.

4.2. DP Matching Processor

There is not particular need to modify the DP matching processor in the present exemplary embodiment from that of the first exemplary embodiment.

The left and right post-thinning images to be supplied to the DP matching processor differ in that, instead of the left post-thinning image in particular being simply the left source video information arranged at even spacings vertically and horizontally, the left and right post-thinning images on the left and right are both thinned images resulting from the respective left and right source video information being applied with an offset, before arranging at even spacings vertically and horizontally.

4.3 Third Exemplary Embodiment Operation

Figure 8A:
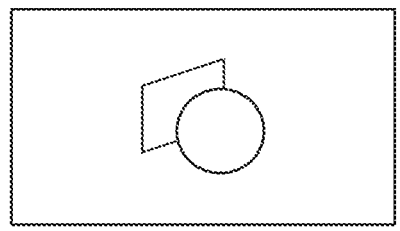
FIG. 8A to FIG. 8C are diagrams to explain an example of an offset situation arising in the third exemplary embodiment.
Figure 8B:
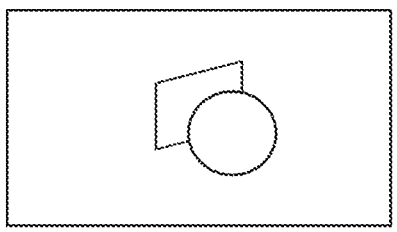
Figure 8C:
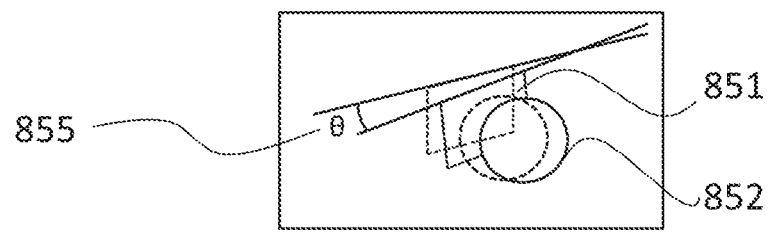

Operation of the third exemplary embodiment will now be described, with reference to FIG. 8A to FIG. 8C, and FIG. 9. FIG. 8A to FIG. 8C are diagrams to explain an example of an offset situation arising in the third exemplary embodiment. FIG. 9 is a diagram to explain an example of thinning operation in the third exemplary embodiment.

Similarly to in the second exemplary embodiment, the left video information illustrated in FIG. 8A and the right video information illustrated in FIG. 8B, apart from objects appearing in only one image such as when a rearward object is obscured by a forward object or the like, preferably the front-rear relationships between objects result simply from parallax and not from up/down misalignment, and appear as left-right displacement.

However, if an imaging system having misplaced alignment in a twist direction about an axis in a direction normal to the imaging plane of a camera of the imaging system is employed and offset is imaged, then this results in an image such as that of FIG. 8C. Namely, instead of the expected image 851, in the vicinity of the object being gazed at, a resultant image 852 is influenced by a tilt misalignment angle θ 855 (hereinafter referred to as "alignment error angle") mainly due to camera alignment error.

The offset determination section accordingly performs correction to the left and right by the same angle. Namely, the left and right offset determination sections are given an equal role in correcting the alignment error angle θ, and correction is performed by rotation extraction. This thereby enables the integrity of alignment in the vertical direction to be maintained as a result.

Note that similarly to in the second exemplary embodiment, in consideration of cases in which the video information has reverse parallax, a separate offset is needed for offset in the horizontal direction. Thus, in addition to increasing the numeric value along with scanning as described above, an offset is further added to address reverse parallax.

Figure 9:
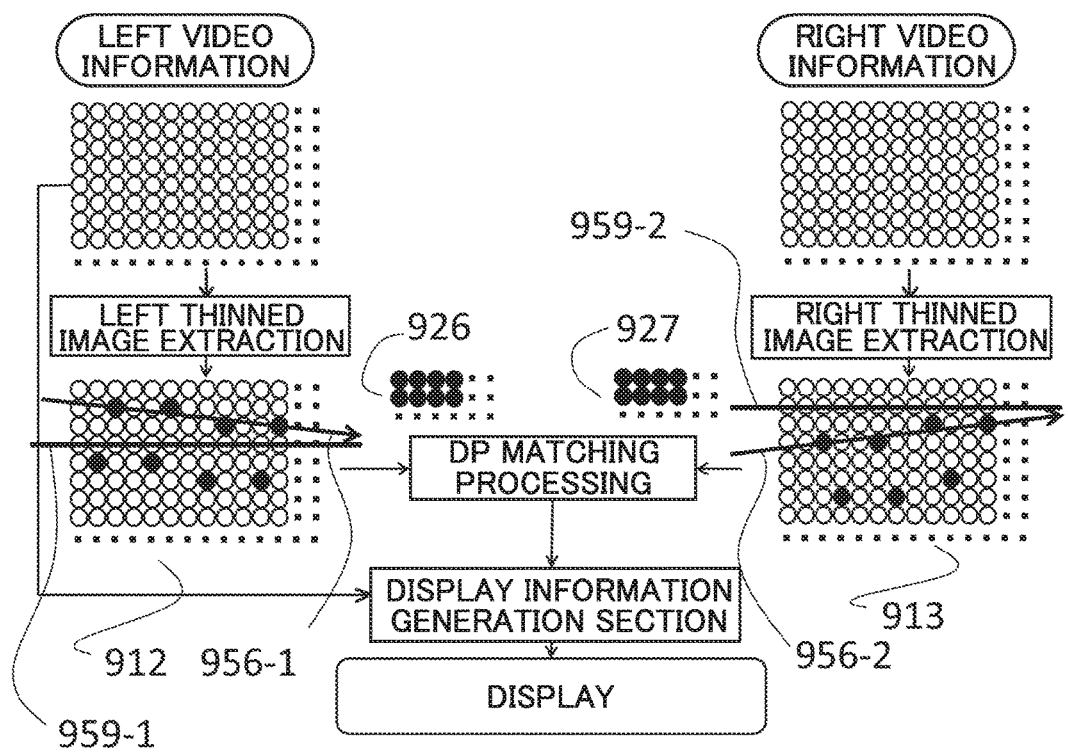
FIG. 9 is a diagram to explain an example of thinning operation in the third exemplary embodiment.

The above operation may be summarized from the perspective of the data of the video information and explained using FIG. 9. Note that FIG. 9 illustrates a case in which the alignment error angle is θ.

The value of offset in the left and right offset determination sections is added to or subtracted from the basic read positions computed by the basic address computation section through the operation of the address addition section 745. The memory addresses to be read from the frame memory are thereby determined. The video information on the left and right obtained in this manner is then subjected to thinned image extraction processing. Left and right post-thinning images 926, 927 are obtained thereby. When this is performed, this results in the pixels 912, 913, illustrated by the black dots in the drawings, being extracted from the left and right source images at the positions in the source video information resulting from action of the left and right offset addition.

In the drawing, the pixel row 956-1 to extract the left thinned image is tilted by θ/2 with respect to horizontal line 959-1, and the pixel row 956-2 to extract the right thinned image is tilted by θ/2 with respect to horizontal line 959-2. As a result, the pixel rows extracted for the thinned images are tilted at θ with respect to each other.

These are output to the display after being subjected to DP matching processing and display information generation processing.

Note that the left source video information sent from the left frame memory in the display information generation processing also employs read positions applied with a calculation by the left offset determination section. This accordingly results in a complete match in positional correspondence between the depth estimation used in distance computation and the 2D movie.

If an attempt is made to realize such an operation using a computer program, then the offset addition amount is simply twice as much, and so problems may arise from a performance perspective. In such cases, this may be addressed by using an offset addition only on the right side, and not using an offset addition on the left side. However, in such cases, an accurate depth estimation may not always be achieved, and overall this approach results in depth distortion at the image periphery.

However, there are, for example, situations in which a content producer may intent such distortion. In such cases, the option remains of restricting offset addition to the right side alone, in order to preserve an author's right of integrity.

In the present exemplary embodiment, situations arise in which the pixels at the image peripheral edges have to be discarded. Undertaking such measures as forcibly blacking out the vicinity thereof enable a natural video representation to be maintained.

As described above, by the action of the offset addition section, the present exemplary embodiment avoids problems due to the occurrence of camera alignment error angles, and is also able to make a valid depth estimation even in cases in which there is reverse parallax.

5. Fourth Exemplary Embodiment

Next, explanation follows regarding a fourth exemplary embodiment, with reference to FIG. 10A to FIG. 13.

Similarly to in the second exemplary embodiment, the fourth exemplary embodiment also changes peripheral configuration to the offset addition section so as to enable accurate depth estimation even when there are difficulties with the captured images. The fourth exemplary embodiment mainly differs from the second and third exemplary embodiments in that consideration is given not only to errors caused by alignment, but also to image distortion due to lens aberration.

The present exemplary embodiment is configured substantially the same as the second exemplary embodiment; however, the configuration and operation of peripheral configuration to the offset determination section differ therefrom.

5.1 Offset Addition Section

Lens distortion is sometimes a factor imparting an influence on vertical direction misalignment between left and right images subjected to processing in depth estimation using a penalty matrix.

The action of lens aberration appears as a distortion causing straight lines in an object image to curve. The fourth exemplary embodiment aims to deal with such distortion. Namely, the present exemplary embodiment deals with problems arising in all situations such as lens aberration, in addition to the alignment errors such as those of the imaging systems as described above. Although the manufacturing cost rises in this exemplary embodiment, which of the exemplary embodiments to employ may be determined by overall consideration of the content and purpose of the three-dimensional display, the size of the display image, video speed, display mode, and the like.

5.1.1 Background and Significance of Look Up Table Implementation

Figure 10A:
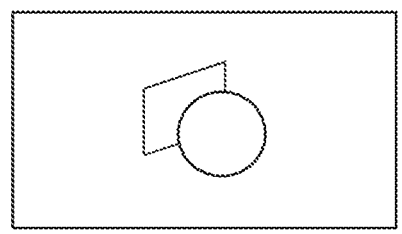
FIG. 10A to FIG. 10D are explanatory diagrams of examples of offset situations arising in a fourth exemplary embodiment.
Figure 10B:
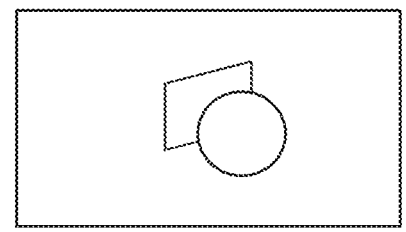
Figure 10C:
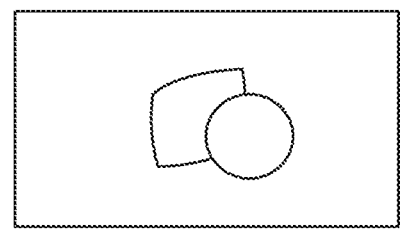
Figure 10D:
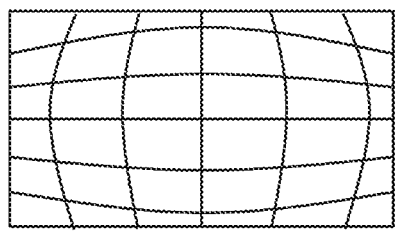

In an imaging system, imaging is performed through a lens, except in special cases in which there is no lens, such as in a pin hole camera. Thus when imaging, the imaging is affected by the shape of the lens and the like, and the object subject to imaging does not remain the same shape at the imaging plane on the opposite side of a lens position boundary, and is somewhat distorted. In such circumstances, as illustrated in FIG. 10A to FIG. 10D, even when an object subject to imaging is a flat plane, sometimes distortion arises so as to bulge at the center, in what is known as barrel distortion (see FIG. 10D), and sometimes distortion arises such that the perimeter is curved in toward the center, in what is known as pincushion distortion. In such cases, an image like the example of desirable right video information (FIG. 10B) is not obtained, and instead an image having a curved perimeter is obtained (FIG. 10C). This results in a mismatch in the vertical direction to the corresponding left video information (FIG. 10A).

Similarly to the second exemplary embodiment, the present exemplary embodiment is also mainly designed to reduce the harm from vertical direction misalignment. The misalignment that the present exemplary embodiment attempts to deal with is to correct curves so as to reproduce the original straight lines, and thus repeated integer additions or subtractions as in the second exemplary embodiment do not suffice.

Thus, in consideration of the above background, the present exemplary embodiment employs look up tables to enable real-time processing. Moreover, a reliable approach compatible with 2D movies is achieved due to performing address conversion for the left and right frame memories using look up tables.

5.1.2 Offset Addition Section Configuration Employing Look Up Tables

A description follows of an offset addition section, with reference to FIG. 11. FIG. 11 is a configuration diagram of peripheral configuration to a thinning extraction section in the fourth exemplary embodiment.

A left frame memory 1116, a right frame memory 1117, a horizontal index counter 1141, and a vertical index counter 1142 have the same configuration and the same operation as that of the second exemplary embodiment, and descriptions thereof are therefore omitted.

A left look up table 1161 is input with vertical and horizontal indices indicated by the horizontal index counter 1141 and the vertical index counter 1142, and is configured so as to output values having a 1:1 correspondence thereto. These output values are used as addresses to read images from the left frame memory 1116.

Moreover, when the vertical and horizontal index counters are at addresses indicating predetermined thinning extraction pixels then the left look up table 1161 is able to detect this, so as to extract pixels at the corresponding read addresses from a recorded image in a separate left frame memory 1116.

Similarly, a right look up table 1162 is input with vertical and horizontal indices indicated by the horizontal index counter 1141 and the vertical index counter 1142, and is configured so as to output values having a 1:1 correspondence thereto. These output values correspond to addresses to read an image from the right frame memory 1116.

Moreover, when the vertical and horizontal index counters are at addresses indicating predetermined thinning extraction pixels, the right look up table 1163 is also able to detect this so as to extract pixels at the corresponding read addresses from a recorded image in a separate right frame memory 1117.

Namely, the difference between the left look up table 1161 and the right look up table 1162 is only that the video information to be subjected to correction is recorded in the separate left or right frame memory. Even if the aberration differs in the cameras that captured the respective video information, this only means that there is a difference in the data recorded between the conversion tables.

5.2 DP Matching Processor

No particular changes need to be made to the DP matching processor of the present exemplary embodiment from that of the third exemplary embodiment. The only point differing therefrom is that the position in the source video information of the sole post-thinning image is not based on a calculation such as offset addition or the like, and is instead determined from the look up tables 1161, 1162.

5.3 Fourth Exemplary Embodiment Operation

Figure 12:
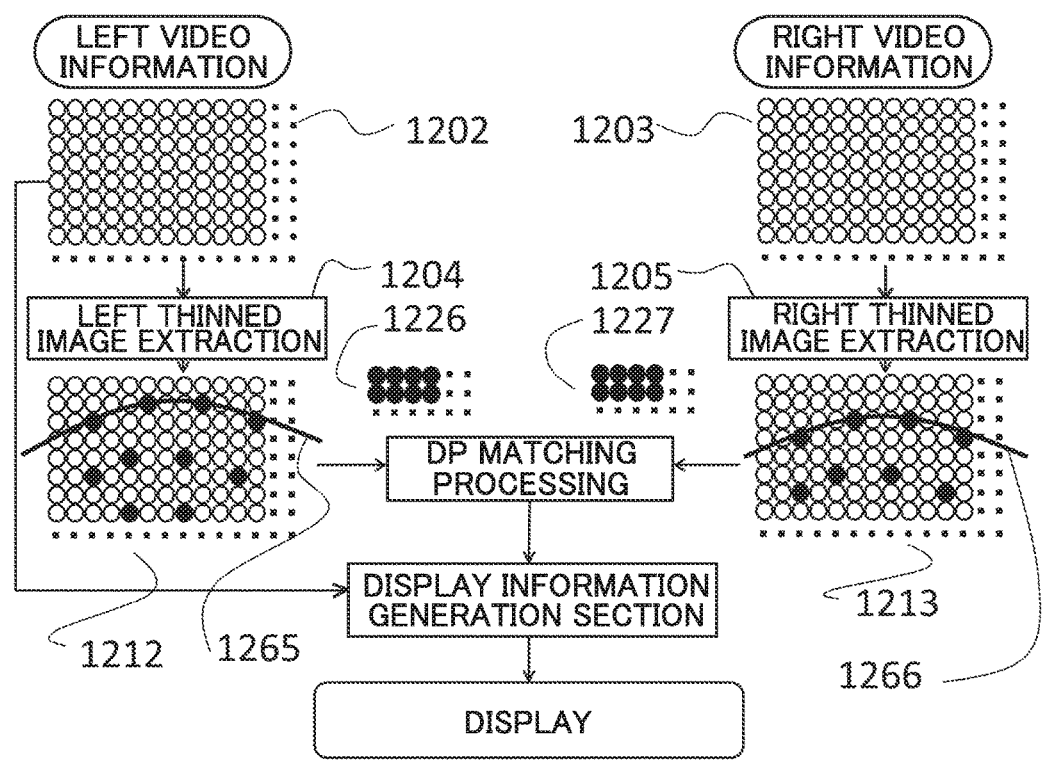
FIG. 12 is an explanatory diagram of an example of thinning operation in the fourth exemplary embodiment, and pays attention to the video information.
Figure 13:
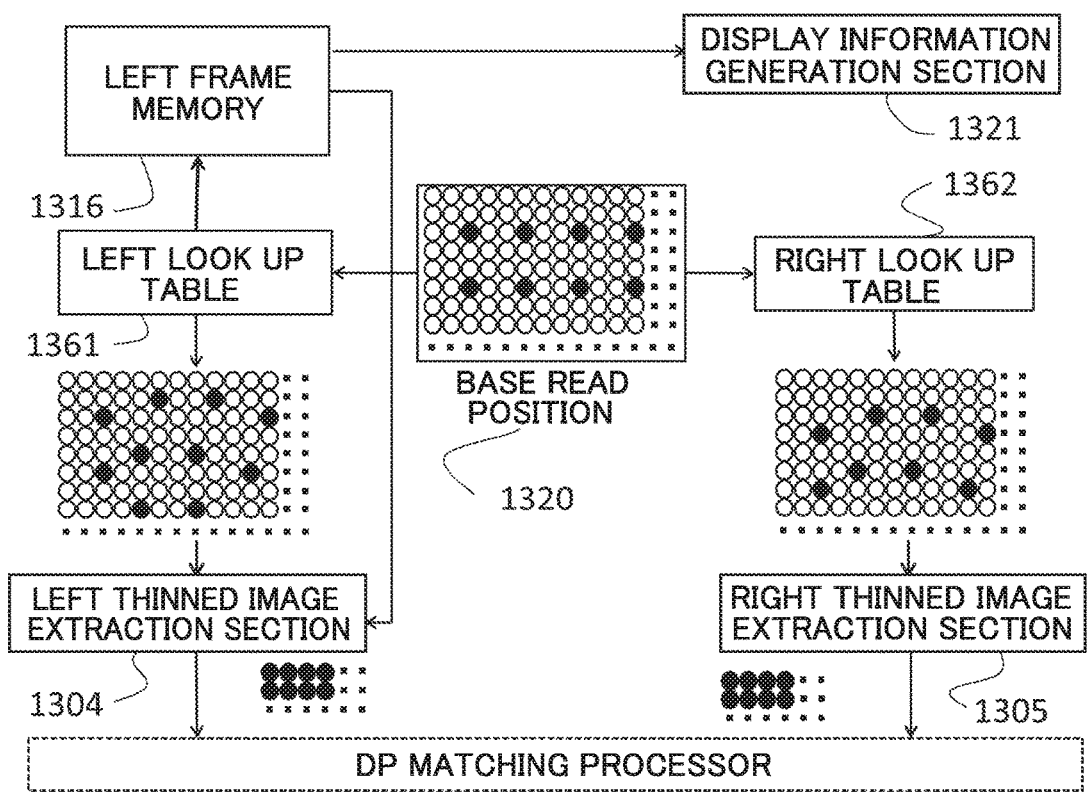
FIG. 13 is an explanatory diagram of address conversion from a base read position to a frame memory read position in the fourth exemplary embodiment.

The operation of the fourth exemplary embodiment will now be described, with reference to FIG. 12 and FIG. 13. FIG. 12 is an explanatory diagram of an example of thinning operation in the fourth exemplary embodiment, and pays attention to the video information. FIG. 13 is substantially the same as FIG. 12, except in that it is an explanatory diagram paying attention to base address conversion conditions in such a configuration.

Note that FIG. 12 and FIG. 13 illustrate examples in which barrel distortion has arisen due to lens aberration.

The left and right video information 1202, 1203 obtained are respectively subjected to thinned image extraction processing through the action of look up tables as described above. The left and right post-thinning images 1226, 1227 are thereby obtained. When this is performed, the position in the source video information under the action of the left and right look up tables results in the pixels 1212, 1213 illustrated by the black dots in the drawings being extracted from the left and right source images.

Namely, due to read positions being recorded in the look up tables so as to account for the aberration and camera alignment error, reading is performed while avoiding the effects of aberration by reading pixels from the frame memory that take into account aberration 1265, 1266 in the left and right images, as illustrated by the black dots in the drawings, without performing complicated calculations to read pixels from the frame memories. These pixels are output to the display through the DP matching processor and a display information generation processor.

Note that the left source video information sent from the left frame memory to display information generation processing also employs read positions that have been applied with address conversion using the left look up table. This accordingly results in a complete match in positional relationships between the depth estimation used in distance computation and the 2D movie.

Moreover, for horizontal direction correction using a look up table, a separate offset is needed when considering cases in which the video information has reverse parallax. Such a look up table enables read address conversion also in such cases, and so is convenient from that perspective.

Although this is partly repetition, the operation thereof will now be summarized from the configuration perspective and explained with reference to FIG. 13.

Base read positions 1320 indicated by the vertical and horizontal index counters 1141, 1142 are referenced in the left and right look up tables 1361, 1362 as addresses before conversion. Except for situations when the left and right frame memories are accessed to write image information, all addresses converted by these look up tables are read. In particular, the video information obtained from the left frame memory gradually converted by the display information generation section into video information of a format to match the display.

The positions in the base read position 1320 of the black dots in the drawings where thinning extraction is to be performed are converted by the left and right look up tables 1361, 1362 to positions that have been affected by aberration or the like so as to designate corresponding pixels in the left frame memory 1316 and the right frame memory. Thus the pixels read are pixels from which the influence of aberration or the like has been removed. The designated pixels are passed to the DP matching processor as the results of the left and right thinned image extraction processing 1304, 1305.

As described above, a feature of the present exemplary embodiment is the point that, except for situations when video information is recorded in the frame memories, the base read position 1320 is not used as the access address for direct reading from the left and right look up tables 1361, 1362.

As described above, by using the look up tables, the present exemplary embodiment reduces problems arising from camera alignment error angles and the influence lens aberration has on depth estimation processing, and also enables valid depth estimation to be achieved even in cases in which there is reverse parallax.

6. Video Information Recording Medium

This ends the above description of the three-dimensional video image display processing device, and now a simple description will be given regarding a video information recording medium employed together with such a device.

As is apparent from the above description, the ultimate aim of the three-dimensional video image display processing device of the exemplary embodiments is to achieve real-time video display, and to also utilize brain processing of the viewer when processing video while reducing DP matching failures due to misalignment, such as for the alignment in the vertical direction.

Misalignment in alignment such as this arises due to being affected by manufacturing accuracy of the imaging system, lens accuracy, etc., and may be thought of as being substantially dependent on the uniqueness of the imaging system.

Taking such an approach means that, excluding 3D or the like generated entirely within a computer, all video information has a one-to-one correspondence with an imaging system, with video information obtained from a single imaging system being uniform and inheriting substantially the same uniqueness.

Thus, by recording and distributing video information to be reproduced on the present three-dimensional video image display processing device using a video recording medium, information related to alignment and information related to lens aberration is contained on the recording medium. Thus, making use of this information during reproduction enables the elimination of setting operations by the user of the processing device.

This is described in more detail below.

In a video recording medium for use in reproduction with the three-dimensional video image display processing device according to the first exemplary embodiment, constants to be used for offset are recorded therein, these constants may then be read by the three-dimensional video image display processing device and used by the offset addition section to set the offset values to be employed.

In a video recording medium for use in reproduction with the three-dimensional video image display processing device according to the second exemplary embodiment, respective offset values are recorded therein for vertical and horizontal offsets, these values may then be read by the three-dimensional video image display processing device and used by the left and right offset addition sections to set the offset values to be employed.

In a video recording medium for use in reproduction with the three-dimensional video image display processing device according to the third exemplary embodiment, respective offset initial values are recorded therein for vertical and horizontal offset, together with proportions or the like to increase or decrease the offset, and these values may then be read by the three-dimensional video image display processing device and set in the left and right offset addition sections.

In a video recording medium for use in reproduction with the three-dimensional video image display processing device according to the fourth exemplary embodiment, all the conversion data for left and right look up tables is recorded therein, this data may then be read by the three-dimensional video image display processing device and recorded in the look up tables.

Obviously these offset values and look up table conversion data (referred to collectively below as "conversion data etc.") may be recorded in a superimposed manner, such that the conversion data etc. can be selectively extracted as appropriate and recorded.

Moreover, there is no need to limit recording of the conversion data etc. to a single video recording medium, and if plural items of contents are recorded so as to enable a viewer to select and browse videos then conversion data etc. may be recorded for each of such content. Moreover, if a single item of content is configured by plural scenes then the conversion data etc. may be recorded for each scene.

In such cases, the three-dimensional video image display processing device may be configured so as to update the offset values for each scene. There is no particular change to the above exemplary embodiments from a configuration perspective. It is sufficient to simply provide an offset value update unit including a buffer such that updating of the offset values is completed prior to displaying the scene to be reproduced, and the conversion data etc. may be switched and used as appropriate.

If the focal point position is different depending on the scene, then there are situations in which it is more appropriate to use different conversion data etc. Although the conversion data etc. mainly depends on the imaging system, in such cases a method can be adopted in which even when the same imaging system is being employed, the conversion data etc. is recorded so as to enable updating according to the imaging scene.

Note that there is no need to restrict the way in which conversion data etc. is recorded. A method may be adopted in which the conversion data etc. is superimposed within the video information, so as to then be separated during reproduction, or a method may be adopted in which the conversion data etc. is recorded in a separate track, and after the three-dimensional video image display processing device has acquired the conversion data etc. in advance, then inputs the video information.

7. Video Information Recording Server

Regarding a video information recording medium, recording the conversion data etc. in association with the video information is as described above. However, similarly thereto, in cases in which video information recorded in the cloud is being managed, a method may be adopted in which the conversion data etc. is recorded in the same manner with links, and distributed in response to requests.

Which conversion data etc. to distributed in each of the exemplary embodiments is the same situation as for the video information recording medium described above, and so further description is omitted.

7.1 Server Outline Configuration

As a server, an ordinary server capable of performing processing according to http or https protocols will suffice. For example, an "APACHE (registered trade mark)" server presided over by "the apache software foundation" may be employed.

7.2 Server Information Recording

The data to record on the server also does not differ from that of the video information recording medium.

A method may be adopted in which the conversion data etc. is superimposed within video information in a response to an http request calling for a single item of video information, such that the conversion data etc. is then separated at the client side, or the conversion data etc. may distributed in a response to a separate request.

8. Other

A simple description follows regarding points which have not been sufficiently described in the above exemplary embodiments.

8.1 Implementing and Executing Computer Program

For each of the exemplary embodiments, a program to implement each function may be deployed in order to cause a computer to function as the image display processing device. More precisely, for a computer including memory and a CPU, which is a hardware processor, the computer is caused to function as the image display processing device by the CPU executing a program loaded into the memory. A program stored on a non-transitory storage medium, such as a HDD, SSD, or DVD may be loaded into the memory.

In such cases, each of the frame memories (216, 217, . . . ) may be assigned to the main memory of the computer, and an image buffer within the display information generation section may also similarly be assigned to the main memory of the computer. When doing so, the processing time in the thinned image extraction section for the DP matching processing is short, and when there is no need for buffer processing in the display information generation section 221, a region in the main memory prepared for the frame memories (216, 217, . . . ) may be utilized as-is.

8.2 Alignment Error Calibration Method Proposal

A simple explanation now follows regarding calibration of conversion data etc. in each of the exemplary embodiments.

In the first to third exemplary embodiments, the offset values are only a small volume of information, and so an appropriate offset value may be determined while simply imaging a calibration object.

However, the conversion data recorded in the look up tables 1161, 1162 in the fourth exemplary embodiment is difficult to generate from raw measurement results alone, and so some ingenuity is required.

Use of a calibration plate is handy to address this point. A description follows regarding a suitable calibration plate method for generating the conversion data recorded in the look up tables.

Figure 14:
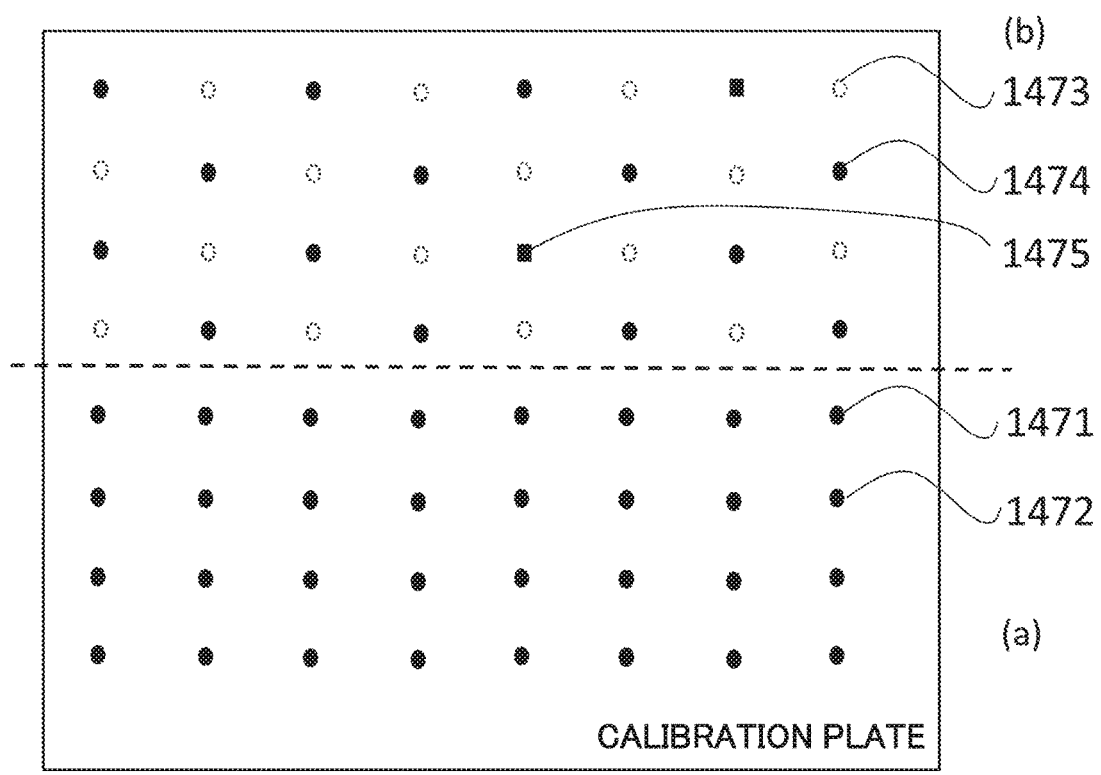
FIG. 14 is an explanatory diagram of a calibration plate.

More precisely, a plate recorded with the points such as those illustrated in FIG. 14 is employed. There is a method in which a pattern drawn on this plate is imaged by an actual imaging system, and the look up table conversion data is determined based on the imaging result.

FIG. 14 illustrates calibration plate example displays. Note that two examples are illustrated together at (a) and (b) in FIG. 14.

First, there is a method in which, as primitively illustrated at (a) in the drawing, a group of dots arrayed at even spacings is imaged, how this will be captured by left and right cameras configuring the imaging system is ascertained, and the portions corresponding to the dots 1471, 1472 are determined as thinning extraction positions. Thus, a dot can be thought of as simply being an amount substantially equivalent to 1 pixel worth in the imaging device. In such case the dot spacing is equivalent to the thinning spacing.

A method may also be adopted in which plural thinning extraction pixels are formed into a group, and a single dot is drawn to represent the group. In such cases, all of the points corresponding to thinning extraction points are not ascertainable from the captured image, and so interpolation is performed therebetween.

On the other hand, there is a method in which, as illustrated at (b) in the drawing, a group of dots arrayed in a staggered lattice shape is imaged, how his will be captured by left and right cameras configuring the imaging system is ascertained, and the thinning extraction positions are determined based on dots 1473, 1474. In such cases, all of the points corresponding to thinning extraction points are not ascertainable from the captured image, and so interpolation is performed therebetween.

Adopting such an approach enables ascertaining which dots correspond to each other on the left and right to be accomplished easily. Moreover, a single dot 1475 of different shape may be included in the plural dots, and this may be used as a handle to easily associate dots imaged on the left and right.

8.3 Brain Fatigue Countermeasures

However, in a three-dimensional image, due to a stereoscopic object being constructed based on slightly different parallax images entering the two eyes, and by utilizing subconscious brain processing, if a person looks at a three-dimensional image continuously for a prolonged period of time, it is not hard to imagine that brain fatigue might occur. Thus, the depth estimation values obtained in the DP matching processor in the device according to the present exemplary embodiment may be contracted by a predetermined ratio or the like, thereby compressing parallax and reducing brain processing, so as to enable an alleviation of fatigue.

Moreover, in contrast to the uniform parallax obtained by the imaging system, there are obviously differences in the parallax of individual people, and even with the same three-dimensional image this results in individual people having a different sense of distance. By increasing or reducing the depth estimation values obtained by the DP matching processor using a predetermined ratio similarly to as described above, the difference in the unique parallax of individual people id accommodated, so as to enable the same sense of distance to be imparted to whoever is looking at the display.

9. Correspondence Relationships of Present Disclosure Wording

The following describes the correspondence relationships of wording used in the present disclosure. In regard to this point, in the proceeding description of embodiments to implement the disclosure, terminology is selected from the perspective of facilitating understanding, and even though there might be a difference to the meaning of the terminology in general society, this does not mean that the present disclosure is limited thereby.

The "first video information" and the "second video information" normally correspond to left video information and right video information. Depending on the mode of use/implementation mode, however, the opposite relationship may apply, and there is also no limitation to two. Similarly, the "first thinned image extraction section" and the "second thinned image extraction section" also normally correspond to left and right "thinned image extraction sections"; however, the opposite relationship may apply. "First" and "second" are omitted in the following.

The "thinned image extraction section" is as described below.

In the first exemplary embodiment, the thinned image extraction section corresponds to the base address determination section 220, the offset addition sections 218, 219, and the thinned pixel determination/extraction sections 224, 225, taken as a whole.

In the second exemplary embodiment, the thinned image extraction section corresponds to the vertical and horizontal index counters 441, 442, the offset determination section 443, and the basic address computation section 444, taken as a whole.

In the third exemplary embodiment, the thinned image extraction section corresponds to the horizontal and vertical index counters 741, 742, the offset determination sections 741-1, 741-2, the basic address computation section 744, and the address addition sections 745-1, 745-2, taken as a whole.

In the fourth exemplary embodiment, the thinned image extraction section corresponds to the vertical and horizontal index counters 1141, 1142, and the look up tables 1161, 1162, taken as a whole.

The present disclosure is applicable as a three-dimensional video image display processing device in the device manufacturing industry. The present disclosure is also applicable in the manufacturing industry for information recording media to provided such a device. The present disclosure is, moreover, also applicable in the information providing industry that provides information to realized such a device.

Of the reference signs in the drawings, the numerical values at the top are drawing numbers. Note that the reference signs are assigned such that where the trailing two digits are the same in different drawings, this means that the elements are functionally substantially the same as each other.

1. Terminology Definitions

Prior to describing a method to solve such issues, for convenience in the description, the terminology is defined as follows in the present specification.

"Video" means an information group that is a collection of plural images arranged in a time series, such that displaying the images to a viewer in sequence causes imaging subjects to appear to move continuously due to the action of the after-image effect in vision.

"Imaging system" means a collection of plural cameras disposed to capture an imaging subject simultaneously, and includes the relative positional relationships of the cameras.

"Mutually discrete pixels" means pixels that are not mutually adjacent for pixels arrayed in a continuous vertical-horizontal lattice. Accordingly, at least the following eight pixels are not "mutually discrete pixels" to a pixel $p(i, j)$.
$p(i-1, j-1)$, $p(i-1, j)$, $p(i-1, j+1)$,
$p(i-1, j)$, $p(i+1, j)$,
$p(i+1, j-1)$, $p(i+1, j)$, $p(i+1, j+1)$.

"Pixels" means elements arrayed continuously in a flat plane in a vertical-horizontal lattice so as to configure an image, irrespective of whether the content of the elements is color information structural units such as what is known as RGB, or simply brightness information.

"Basic information for finding an offset value" means information required by an offset addition section to compute an offset, in a three-dimensional video image display processing device according to the present disclosure.

"Video information set" means overall information that combines one video and another video captured at different viewpoint to this video, and is the minimum information to enable a video to be displayed stereoscopically.

"Video information collection" means overall information obtained by adding predetermined information to the video information set.

"Base read position" means a position that is recorded in frame memory, and, in cases in which the assumption is made that misalignment is not occurring due to causes other than parallax, is the position to read video information in a video information set obtained when the same object is simultaneously captured by the same imaging system.

"Scene" means a unit of time-consecutive video information as long as there is no great change in the distance between the imaging system and the object serving as the imaging subject, and this is one element configuring the video information set.

"Displacement" means that, across two referenced images, a pixel under consideration in one of the images has a different coordinate on a corresponding scan line to that of the corresponding pixel in the other image.

2. Description of Solution to Problem

In order to achieve a reduction in the above problems, an object of the present disclosure is to provide a three-dimensional video image display processing device and the like that, for videos, utilizes the completion ability of human vision (including brain function) and the power to reconstruct a viewed object in the brain, so as to simply and stably realize a video image stereoscopically while employing DP matching.

Description now returns to the conceptual background to what is known as stereo viewing.

Algorithms that uses DP to estimate depth, from images captured by two cameras having different parallax to each other, scan in a direction horizontal with respect to a plane in which both cameras are placed.

The scan direction is employed in this manner based on the reasoning that, since the cameras are substitutes for human eyes, if the cameras are placed similarly to eyes, and the image captured by the left camera is perceived by the left eye and the image captured by the right camera is perceived by the right eye, then this will enable a sense of distance to be created by brain processing.

The images having the most significance when images with parallax are presented to a viewer stereoscopically are images in which boundary lines of edges or feature patterns of an object straddle a connecting line between a viewpoint center of the left eye and a viewpoint center of the right eye at a large angle. Then, if needed, a person may tilt their head, for example, to obtain a meaningful image. The underpinning message here is that, in order to attempt to implement functioning similar to human brain processing using a processing device connected to two cameras, it should be sufficient to set a scan direction as horizontal and track disparities between output images of cameras having parallax in the scan line direction.

However, a three-dimensional object cannot be perfectly modeled in a processing device anyway. Namely, from the perspective of the volume of information, it is not possible to reproduce information in three-dimensions from information in two dimensions that can only be acquired from one direction. However, a three-dimensional form can be "predicted to some extent" even with information from one direction. Various trials in the technical field of stereo viewing make use of assistance from the subconscious processing in human vision and the brain to give a natural representation within a predictable range. A configuration of a display processing device can be regarded as being something decided based on either vision or brain function.

The present disclosure is dedicated to the processing of video information and attempts to alleviate the above problems, while utilizing processing of vision and the brain, such as the brain knowing that the shape of an object will not change greatly over short time scales, that the distance-measuring capacity for depth is relative and it is difficult to know the absolute distance to an object, and a three dimensional shape can be perceived by tracking movement.

Note that this topic will be described based on each aspect, and in order to facilitate understanding reference will now be made to FIG. 1. The use this drawing is merely to promote understanding, and the flow of information and the element configuration are not limited to those depicted in the drawings.

First Aspect

A first aspect is a three-dimensional video image display processing device input with first video information (102) and second video information (103), and causing a three-dimensional image to be displayed on a display (111) by processing the first video information and the second video information.

The three-dimensional video image display processing device includes two thinned image extraction sections (a first thinned image extraction section (104) and a second thinned image extraction section (105)), a DP matching processor (109) that performs calculations using DP matching based on thinned image information (112, 113) obtained from the respective thinned image extraction sections, and a display information generation section (110).

The second video information (103) is simultaneously captured with the first video information (102), at a position having parallax to the first video information (102). The first video information and the second video information have substantially the same resolution as each other and configure a video information set. Simultaneously imaging at positions having parallax to each other has the advantageous effect of giving a method by which to estimate the depth of objects being imaged. Moreover, making the resolutions substantially the same as each other has the advantageous effect of eliminating the need to preform calculations using image size ratios.

The first thinned image extraction section (104) identifies respective discrete positions of pixels configuring the first video information input to the same device, and extracts pixels at these identified positions and outputs these pixels. Namely, the advantageous effect is exhibited of enabling an image to be acquired from a first image configuring the video, with the acquired image being respectively thinned in a predetermined direction, as well as in a direction normal thereto.

Moreover, the thinning has the advantageous effect of reducing the number of pixels to be subsequently subjected to computation.

The second thinned image extraction section (105), similarly to the first thinned image extraction section, identifies respective discrete positions of pixels configuring the second video information input to the same device, so as to extract pixels at these identified positions and to output these pixels.

In addition, the identified positions are configured to have positions having a one-to-one correspondence relationship with the positions identified by the first thinned image extraction section. The meaning of "correspondence" here is that for one pixel and an adjacent pixel thereto in the image obtained from the first thinned image extraction section (referred to below as the "first post-thinning image (112)"), there is also an adjacent relationship for pixels corresponding to the one pixel and the adjacent pixel in an image obtained from the second thinned image extraction section (referred to below as the "second post-thinning image (113)). Depending on the implementation method adopted, there may be bits missing from post-thinning images, at the vicinity of a peripheral boundary to the first post-thinning image and/or at the vicinity of the peripheral boundary to the second post-thinning image, where such a correspondence relationship no longer holds; however, this does not affect the meaning thereof, as long as a correspondence relationship is maintained in the main display region.

Maintaining the correspondence relationship here has the advantageous effect of not overlooking the amplitude of regions of high spatial frequency included in the video information. Moreover, this also has the advantageous effect of avoiding large misalignments in phase.

The DP matching processor (109) finds a cost path using DP matching on the two post-thinning images as a cost. When doing so, a direction of a line segment connecting the viewpoint center of the first video information and the viewpoint center of the second video information is taken as the matching scan direction.

Finding a cost path by DP matching in this matching scan direction enables how much displacement there is, between the first post-thinning image and the second post-thinning image, to be ascertained for an object that is an imaging subject. Namely, this has the advantageous effect of enabling depth information to be obtained between the underlying first video information and second video information.

The display information generation section (110) is configured so as to generate stereoscopic movie information that displays require by applying the depth information obtained by the DP matching processor to either the first video information or the second video information.

Second Aspect

A three-dimensional video image display processing device of a second aspect is the first aspect, further including an offset addition section.

The offset addition section (106) adds an offset value to the positions identified by the first thinned image extraction section, to the positions identified by the second thinned image extraction section, or to both the positions identified by the first thinned image extraction section and the positions identified by the second thinned image extraction section.

The offset value is determined based on relative positional relationships of cameras configuring an imaging system that generated the video information. This has the advantageous effect of normalizing a penalty matrix even for various imaging systems having different relative camera positions.

Moreover, setting a positive offset value has the advantageous effect of eliminating the need for reverse scanning by the DP matching processor at a subsequent stage, even when input with video information having a large parallax between the first video information and the second video information, such as stereo video having reverse parallax.

Third Aspect

In the three-dimensional video image display processing device of a third aspect, in the offset addition section, a further factor is included, with this factor being based on a vector (referred to below as a "camera relative position relationship vector") having a component in a direction of the line segment connecting the viewpoint center of the first video information and the viewpoint center of the second video information.

Adding the camera relative position relationship vector to the offset has the advantageous effect of enabling scanning between the first video information and the second video information to track, while accommodating misalignment in a direction of twist about an axis in a direction normal to the imaging plane of the cameras.

Fourth Aspect

The three-dimensional video image display processing device of a fourth aspect uses a look up table so as to add an offset in the offset addition section. A discrete base read position determination section is included therefor.

The first thinned image extraction section and the second thinned image extraction section are each equipped with frame memory to record video information, together with a look up table.

The discrete base read position determination section identifies sequential discrete positions from continuous base read positions. This has the advantageous effect of determining discrete base read positions to use when both the first and second thinned image extraction sections thin and extract pixels.

The frame memories recording input video information at fixed time intervals has the advantageous effect of enabling output to be performed of pixel information corresponding to an address when this address is designated at random for one frame configuring a video.

Moreover, look up tables for the base read positions are independently provided in the first thinned image extraction section and the second thinned image extraction section, so as to add a conversion recorded in the same table to the read position information indicated by the discrete base read position determination section.

A look up table is able to perform a given function calculation based on results computed in advance. This thereby enables a calculation result to be found in real-time, even for a function that needs complicated calculation. The advantageous effect is accordingly exhibited that, even when there is distortion in the input video information, positions from which the distortion has been removed can be identified instantly, and pixels acquired at these positions.

In the display information generation section, stereoscopic movie information that displays require is generated by applying the depth information obtained by the DP matching processor to either the first video information or the second video information.

With regard to the first video information and the second video information, the result of reading as designated by the look up table from the video information input to the frame memory is treated here as "video information". Thus, even if there is stretch in the length of distortion correction, there is the advantageous effect of being able to process video information having the same stretch by applying an offset.

Fifth Aspect

A fifth aspect is a video information recording medium. The video information recording medium is at least recorded with first video information and second video information, the second video information being simultaneously captured with the first video information at a position having parallax to the first video information.

In addition, the video information recording medium is recorded with basic information to find an offset value to set in the offset addition section configuring the three-dimensional video image display processing device of the third aspect.

The first video information and the second video information recorded here have the advantageous effect of serving as basic information to generate a video viewable stereoscopically with the three-dimensional video image display processing device.

Moreover, the basic information to find the offset value accommodates errors due to the mounting position of cameras in an imaging device that has imaged the first video information and the second video information and configures the three-dimensional video image display processing device, with the advantageous effect of enabling stable reproduction even when imaged with another camera.

Sixth Aspect

A sixth aspect is a video information recording medium. The video information recording medium, in addition to the first video information and the second video information, the second video information being simultaneously captured with the first video information at a position having parallax to the first video information, is also recorded with values to set in the look up tables configuring the three-dimensional video image display processing device of the fourth aspect.

The first video information and the second video information recorded here are similar to that of the fifth aspect.

Moreover, the values to set in the look up tables have the advantageous effect of accommodating distortion due to mounting position of cameras in an imaging device that has imaged the first video information and the second video information and configures the three-dimensional video image display processing device.

Furthermore, as the values to set in the look up tables, in cases in which distortion of images due to lens aberration in the cameras is considered, there is the advantageous effect of being able to pass to the DP matching processor post-thinning images having reduced distortion.

Seventh Aspect

A seventh aspect is an information providing server.

The information providing server is connected to a network and, based on a request obtained over the network, issues first video information and second video information, the second video information being simultaneously captured with the first video information at a position having parallax to the first video information.

In addition, based on a request obtained over the network, the information providing server issues provides information to find an offset value to set in the offset addition section configuring the three-dimensional video image display processing device of the third aspect.

The first video information and the second video information recorded here have the advantageous effect of serving as basic information to cause a stereoscopically viewable video to be generated by the three-dimensional video image display processing device.

Moreover, the basic information to find the offset value accommodates errors due to mounting position of cameras in an imaging device that has imaged the first video information and the second video information and configures the three-dimensional video image display processing device, thereby having the advantageous effect of enabling stable reproduction even when imaged by another camera.

Eighth Aspect

An eighth aspect is an information providing server. The information providing server is similar to the information providing server of the seventh aspect in that, in response to a request obtained over a network, the information providing server issues first video information and second video information, the second video information being simultaneously captured with the first video information at a position having parallax to the first video information.

In addition thereto, based on a request obtained over the network, the information providing server issues to the request originator values to set in the look up tables configuring the three-dimensional video image display processing device of the fourth aspect.

The values to set in the look up tables have the advantageous effect of accommodating distortion due to the mounting position of cameras in an imaging device that has imaged the first video information and the second video information and configures the three-dimensional video image display processing device.

Furthermore, setting values that consider image distortion due to lens-based aberration in the cameras has the advantageous effect of passing post-thinning images having reduced distortion to the DP matching processor.

Ninth Aspect

A ninth aspect is a program employed to realize any one of the first to the fourth aspects using a computer, and description thereof is the same as for the first to the fourth aspects.

Although already stated above, an aspect relationship table is given below in order to easily ascertain the mutual relationships between each of the aspects.

TABLE 3

| Aspect | Type | Relationship Summary |
|---|---|---|
| First | Device | Thinning processing for use when determining representative points to calculate depth |
| Second | Device | Offset addition mainly to correct parallax of cameras or the like |
| Third | Device | Offset addition mainly to correct alignment errors of cameras or the like |
| Fourth | Device | Providing a look up table for offset addition mainly to correct camera lens-based aberration errors |
| Fifth | Medium | Recording medium to provide information to the device of the third aspect |
| Sixth | Medium | Recording medium to provide information to the device of the fourth aspect |
| Seventh | Server | Server to provide information to the device of the third aspect |
| Eighth | Server | Server to provide information to the device of the fourth aspect |
| Ninth | Program | Program corresponding to the first aspect to fourth aspect |

The three-dimensional video image display processing device of the first aspect enables the volume of DP matching processing, which is mainly sequential calculations, to be reduced, thereby enabling high definition video, such as what is known as "full-HD" to be processed in real-time even with a comparatively ordinary processor.

The three-dimensional video image display processing device of the second aspect furthermore enables normalization of the mutual positional relationships of cameras having parallax to each other and simultaneously imaging in different imaging systems. Thus, even though different video information sets result from using imaging systems with different camera placement, despite imaging the same object, the different video information sets are corrected so as to enable the same video display. In other words, a great degree of freedom can be given to the design of the mechanical placement configuration in video information capturing systems. Moreover, matching processing failures can be reduced even when video information with large parallax is input.

The three-dimensional video image display processing device of the third aspect furthermore enables video display with few depth estimation errors, even from video information sets obtained by imaging systems having low manufacturing accuracy, due to accommodating rotational direction misalignment about an in a direction normal to the imaging plane of cameras, for plural cameras having parallax to each other and simultaneously imaging in different imaging systems.

The three-dimensional video image display processing device of the fourth aspect is able to contribute to the generation of three-dimensional images in real-time due to being able to quickly perform thinned image extraction using the look up table. Moreover, due to being able to perform complicated function calculations by using the look up table, non-linear correction can be performed in real-time, so as to display video with few depth estimation errors even when lens aberration is present. Namely, an imaging systems having a comparatively low cost of lens related design can be employed.

The video information recording medium of the fifth aspect is able to provide a video information collection to the three-dimensional video image display processing device of the third aspect, so is enable an improvement to be achieved in the accuracy of depth estimation, without causing any particular trouble to the user of the three-dimensional video image display processing device.

The video information recording medium of the sixth aspect is able to provide a video information collection to the three-dimensional video image display processing device of the fourth aspect, so as to enable a reduction in errors of depth-estimation calculation in peripheral portions caused by lens aberration, without causing any particular trouble to the user of the three-dimensional video image display processing device.

The information providing server of the seventh aspect is able to provide a video information collection to the three-dimensional video image display processing device of the third aspect, so as to enable an improvement in the accuracy of depth estimation to be achieved without causing any particular trouble to the user of the three-dimensional video image display processing device.

The information providing server of the eighth aspect is able to provide a video information collection to the three-dimensional video image display processing device of the fourth aspect, so as to enable a reduction in depth-estimation calculation failures in particular in peripheral portions caused by lens aberration, without causing any particular trouble to the user of the three-dimensional video image display processing device.

The program of the ninth aspect is able to cause a computer to function as the three-dimensional video image display processing device of the first to the fourth aspects.

What is claimed is:

1. A three-dimensional video image display processing device that receives first video information and second video information, the second video information having a resolution that is substantially the same as the first video information and being simultaneously captured with the first video information at a position having parallax to the first video information, and that causes a three-dimensional image to be displayed on a display by processing the first video information and the second video information, the three-dimensional video image display processing device comprising:
   a first thinned image extraction section that specifies first discrete positions of respective pixels from the first video information, and that extracts pixels at the specified first discrete positions from the first video information;
   a second thinned image extraction section that specifies second discrete positions of respective pixels from the second video information, the second discrete positions corresponding to the first discrete positions specified by the first thinned image extraction section, and that extracts pixels at the specified second discrete positions from the second video information;
   a DP matching processor that sets a matching scan direction to a direction of a line segment connecting a viewpoint center of the first video information with a viewpoint center of the second video information, and that uses DP matching to obtain depth estimation information for the pixels extracted by the first thinned image extraction section and the second thinned image extraction section; and
   a display information generation section that generates movie display information for the display using video information of either the first video information or the second video information and using the depth estimation information obtained by the DP matching processor.

2. The three-dimensional video image display processing device of claim 1, further comprising an offset addition section that adds an offset, determined based on relative positions of cameras that generate the video information, to the first discrete positions specified by the first thinned image extraction section or the second discrete positions specified by the second thinned image extraction section.

3. The three-dimensional video image display processing device of claim 2, wherein the offset addition section further adds an offset based on a vector having a component in the direction of the line segment connecting the viewpoint center of the first video information and the viewpoint center of the second video information.

4. A video information recording medium, in which at least first video information or second video information is recorded, the second video information being simultaneously captured with the first video information at a position having parallax to the first video information,
   wherein the video information recording medium is recorded with basic information for finding an offset value to set in the offset addition section in the three-dimensional video image display processing device of claim 3, the basic information being recorded so as to enable the first video information and the second video information to be separated and read.

5. An information providing server that is connected to a network and that, based on a request obtained over the network, issues at least first video information or second video information, the second video information being simultaneously captured with the first video information at a position having parallax to the first video information,
   wherein, based on the request obtained over the network, the information providing server provides information for finding an offset value to set in the offset addition section in the three-dimensional video image display processing device of claim 3.

6. The three-dimensional video image display processing device of claim 1, further comprising a discrete base read position determination section that specifies sequential discrete positions, wherein:
   the first thinned image extraction section includes:
      a first frame memory that records the first video information, and
      a first look up table that associates read positions indicated by the discrete base read position determination section with the read positions in the first frame memory;
   the first thinned image extraction section extracts pixels from the first frame memory at positions referenced in the first look up table;
   the second thinned image extraction section includes:
      a second frame memory that records the second video information, and
      a second look up table that associates read positions indicated by the discrete base read position determination section with read positions in the second frame memory;
   the second thinned image extraction section extracts pixels from the second frame memory at positions referenced in the second look up table; and
   the display information generation section employs, as the video information for generating the movie display information, video information read from the first frame memory using the first look up table, or video information read from the second frame memory using the second look up table.

7. A video information recording medium, in which at least first video information or second video information is recorded, the second video information being simultaneously captured with the first video information at a position having parallax to the first video information,
wherein the video information recording medium is recorded with table values that are set in the first look up table and the second look up table in the three-dimensional video image display processing device of claim 6, the table values being recorded so as to enable the first video information and the second video information to be separated and read.

8. An information providing server that is connected to a network and that, based on a request obtained over the network, issues at least first video information or second video information, the second video information being simultaneously captured with the first video information at a position having parallax to the first video information,
wherein, based on the request obtained over the network, the information providing server provides table values that are set in the first look up table and the second look up table in the three-dimensional video image display processing device of claim 6.

9. A non-transitory recording medium storing a program that causes a computer to execute three-dimensional video image display processing in a three-dimensional video image display processing device that receives first video information and second video information, the second video information being simultaneously captured with the first video information at a position having parallax to the first video information, and the three-dimensional video image display processing device causing a three-dimensional image to be displayed on a display by processing the first video information and the second video information, the three-dimensional video image display processing comprising:
(A) specifying first discrete positions of respective pixels from the first video information and extracting pixels at the specified first discrete positions from the first video information;
(B) specifying second discrete positions of respective pixels from the second video information, the second discrete positions corresponding to the first discrete positions specified in (A), and extracting pixels at the specified second discrete positions from the second video information;
(C) taking a direction of a line segment connecting a viewpoint center of the first video information and a viewpoint center of the second video information as a matching scan direction, and acquiring depth estimation information by performing DP matching on the pixels extracted in (A) and (B); and
(D) generating movie display information for the display using the depth estimation information obtained in (C) and video information of either the first video information or the second video information.

10. The non-transitory recording medium of claim 9, wherein the three-dimensional video image display processing further comprises:
(E) adding an offset to the discrete positions specified in (A) or in (B), the offset being determined based on relative positions of cameras that generate the video information.

11. The non-transitory recording medium of claim 10, wherein (E) adding the offset further includes adding an offset based on a vector having a component in the direction of the line segment connecting a viewpoint center of the first video information and a viewpoint center of the second video information.

12. The non-transitory recording medium storing of claim 9, wherein:
the three-dimensional video image display processing further comprises (F) specifying sequential discrete positions;
(A) extracting the pixels from the first video information further includes extracting pixels at positions referenced in a first lookup table that associates read positions specified in (F) with read positions in a first frame memory that records the first video information;
(B) extracting the pixels from the second video information further includes extracting pixels at positions referenced in a second lookup table that associates read positions specified in (F) with read positions in a second frame memory that records the second video information; and
(D) generating the movie display information further includes using, as the video information, either video information read from the first frame memory using the first look up table, or video information read from the second frame memory using the second look up table.

* * * * *